United States Patent [19]

Weder

[11] Patent Number: 5,666,784

[45] Date of Patent: Sep. 16, 1997

[54] FLORAL WRAPPER UTILIZING A BREATHABLE PACKAGING MATERIAL

[75] Inventor: Donald E. Weder, Highland, Ill.

[73] Assignee: Southpac Trust International, Inc., Oklahoma City, Okla.; not individually, but as trustee of The Family Trust U/T/A dated December 8, 1995, Charles Codding, authorized Signatory for Southpac Trust International, Inc. trustee

[21] Appl. No.: 447,599

[22] Filed: May 23, 1995

Related U.S. Application Data

[60] Division of Ser. No. 325,747, Oct. 19, 1994, which is a continuation-in-part of Ser. No. 188,183, Jan. 28, 1994, Pat. No. 5,388,386, which is a continuation of Ser. No. 968,798, Oct. 30, 1992, Pat. No. 5,369,934, which is a continuation of Ser. No. 865,563, Apr. 9, 1992, Pat. No. 5,245,814, which is a continuation of Ser. No. 649,379, Jan. 31, 1991, Pat. No. 5,111,638, which is a continuation of Ser. No. 249,761, Sep. 26, 1988, abandoned, said Ser. No. 325,747, is a continuation-in-part of Ser. No. 253,648, Jun. 3, 1994, abandoned, which is a continuation of Ser. No. 965,585, Oct. 23, 1992, abandoned, which is a continuation of Ser. No. 893,586, Jun. 2, 1992, Pat. No. 5,181,364, which is a continuation of Ser. No. 707,417, May 28, 1991, abandoned, which is a continuation of Ser. No. 502,358, Mar. 29, 1990, abandoned, which is a continuation-in-part of Ser. No. 249,761, said Ser. No. 325,747, is a continuation-in-part of Ser. No. 108,093, Aug. 17, 1993, Pat. No. 5,472,752, which is a continuation of Ser. No. 24,573, Mar. 1, 1993, abandoned, which is a continuation of Ser. No. 464,694, Jan. 16, 1990, Pat. No. 5,208,027, which is a continuation of Ser. No. 219,083, Jul. 13, 1988, Pat. No. 4,897,031, which is a continuation of Ser. No. 4,275, Jan. 5, 1987, Pat. No. 4,773,182, which is a continuation of Ser. No. 613,080, May 22, 1984, abandoned.

[51] Int. Cl.[6] ............................................... B65B 11/00
[52] U.S. Cl. .................................. 53/397; 53/399; 53/401; 53/461
[58] Field of Search .................... 47/72, 84; 53/397, 53/399, 400, 401, 402, 461; 206/213.1, 204, 423; 229/87.06, 87.08; 424/409, 411, 412, 413, 414, 415; 426/118, 124

[56] References Cited

U.S. PATENT DOCUMENTS

| | | | |
|---|---|---|---|
| 2,774,187 | 12/1956 | Smithers | 206/423 X |
| 3,022,605 | 2/1962 | Reynolds | 206/423 X |
| 3,044,885 | 7/1962 | Loehr . | |
| 3,493,464 | 2/1970 | Bowers et al. . | |
| 3,653,873 | 4/1972 | Bayer . | |
| 3,728,213 | 4/1973 | Hinz . | |
| 3,864,468 | 2/1975 | Hyman et al. . | |
| 3,959,556 | 5/1976 | Morrison . | |
| 3,998,944 | 12/1976 | Long . | |
| 4,008,351 | 2/1977 | Inoue et al. . | |
| 4,111,922 | 9/1978 | Beede et al. . | |
| 4,118,890 | 10/1978 | Shore . | |
| 4,297,811 | 11/1981 | Weder . | |
| 4,343,853 | 8/1982 | Morrison . | |
| 4,400,910 | 8/1983 | Koudstaal et al. . | |
| 4,401,712 | 8/1983 | Morrison . | |
| 4,407,897 | 10/1983 | Farrell et al. . | |
| 4,413,725 | 11/1983 | Bruno et al. | 206/423 X |
| 4,528,226 | 7/1985 | Sweeny . | |
| 4,533,435 | 8/1985 | Intili . | |
| 4,606,956 | 8/1986 | Charbonneau et al. . | |
| 4,646,388 | 3/1987 | Weder et al. . | |
| 4,661,388 | 4/1987 | Charbonneau . | |
| 4,663,077 | 5/1987 | Rei et al. . | |
| 4,666,706 | 5/1987 | Farquharson . | |
| 4,733,521 | 3/1988 | Weder et al. . | |
| 4,743,448 | 5/1988 | Bahadir et al. . | |
| 4,769,264 | 9/1988 | Dreger . | |

(List continued on next page.)

*Primary Examiner*—Daniel Moon
*Attorney, Agent, or Firm*—Dunlap & Codding, P.C.

[57] ABSTRACT

A breathable packaging material used for packaging items, such as floral groupings, flower pots, fresh produce, food, medical supplies/equipment, pharmaceutical products, and the like, thereby forming a breathable package for containing said items. The breathable packaging material comprises a sheet of material having controlled atmosphere characteristics, and having a desiccant and/or an antimicrobial agent. Methods for using breathable packaging material.

8 Claims, 10 Drawing Sheets

U.S. PATENT DOCUMENTS

| | | |
|---|---|---|
| 4,773,182 | 9/1988 | Weder et al. . |
| 4,792,484 | 12/1988 | Moritani . |
| 4,842,875 | 6/1989 | Anderson . |
| 4,848,929 | 7/1989 | Rawl . |
| 4,879,078 | 11/1989 | Antoon, Jr. . |
| 4,888,175 | 12/1989 | Burton, Jr. et al. . |
| 4,910,032 | 3/1990 | Antoon, Jr. . |
| 4,923,650 | 5/1990 | Antoon, Jr. et al. . |
| 4,925,517 | 5/1990 | Charbonneau et al. . |
| 4,988,557 | 1/1991 | Charbonneau . |
| 4,990,381 | 2/1991 | Holzner . |
| 5,011,698 | 4/1991 | Antoon, Jr. et al. . |
| 5,045,331 | 9/1991 | Antoon, Jr. . |
| 5,105,599 | 4/1992 | Weder . |
| 5,111,637 | 5/1992 | Weder et al. . |
| 5,147,706 | 9/1992 | Kingman . |
| 5,160,768 | 11/1992 | Antoon, Jr. . |
| 5,181,364 | 1/1993 | Weder . |
| 5,242,052 | 9/1993 | Weder . |
| 5,254,401 | 10/1993 | Kelch et al. . |

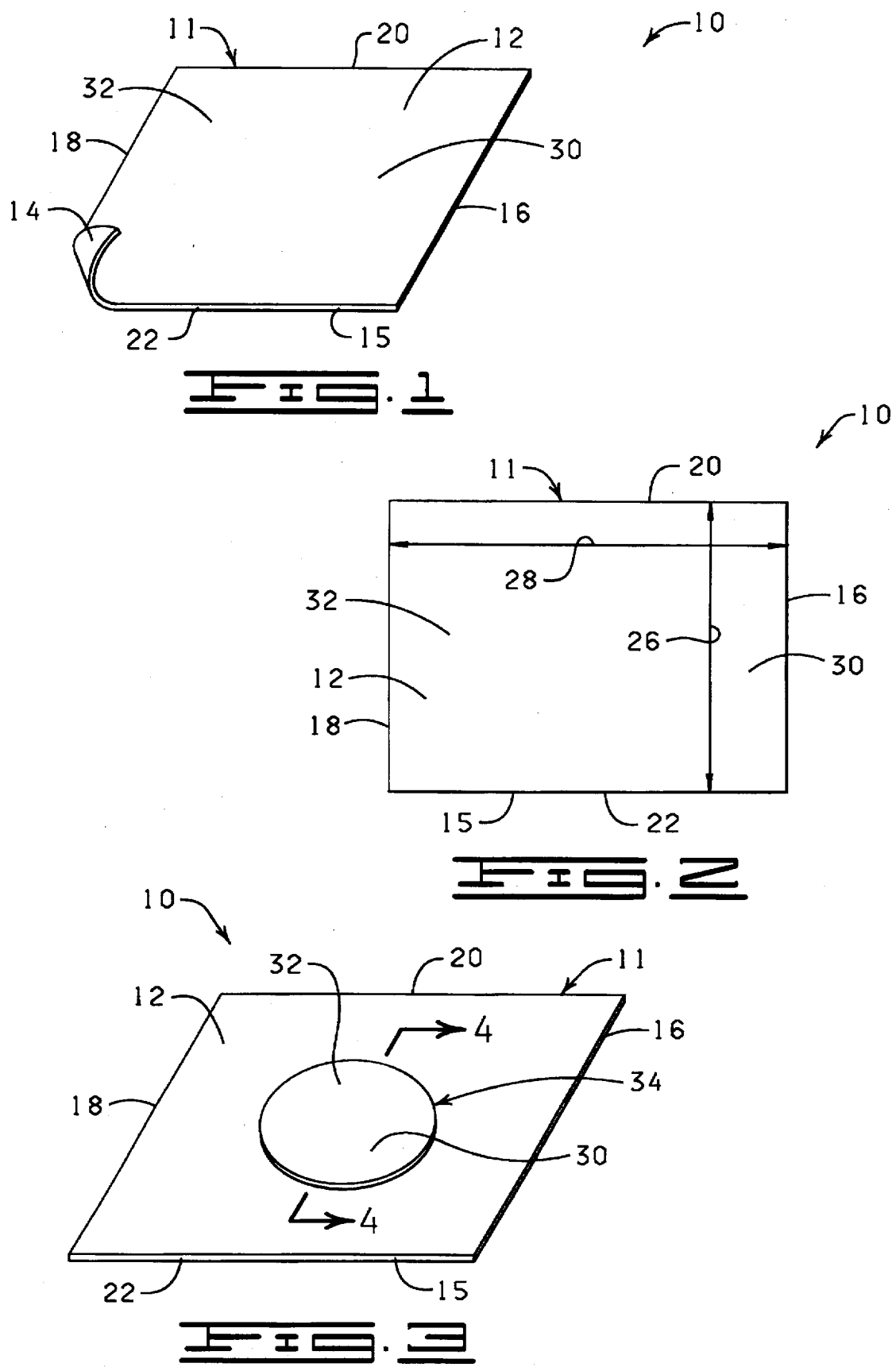

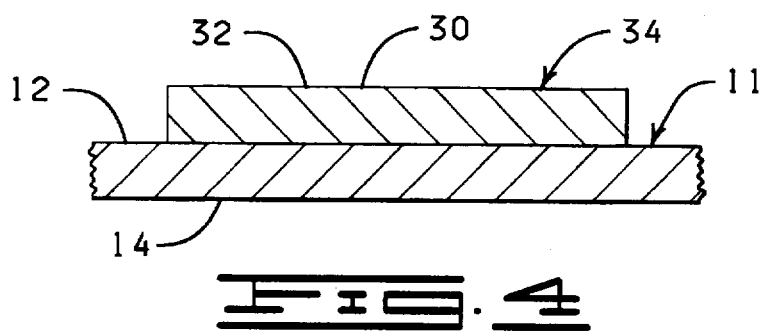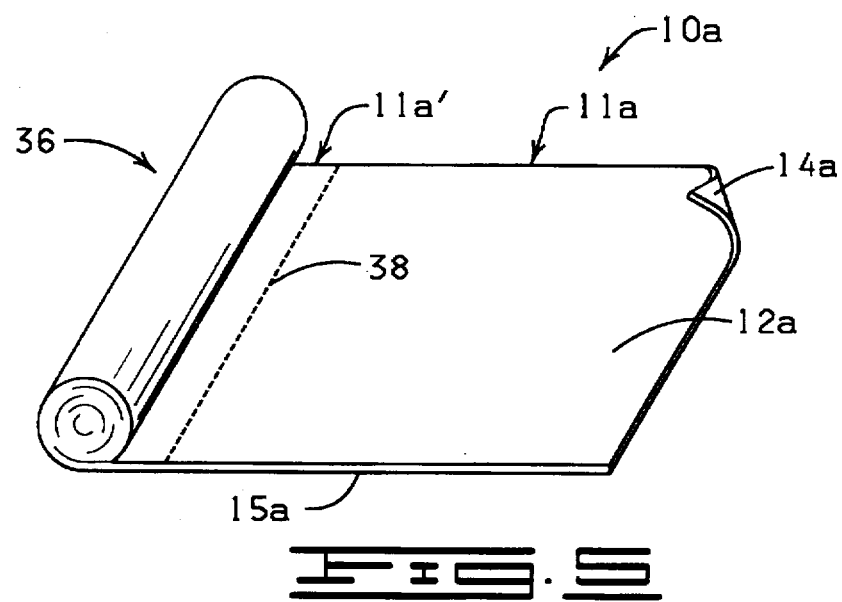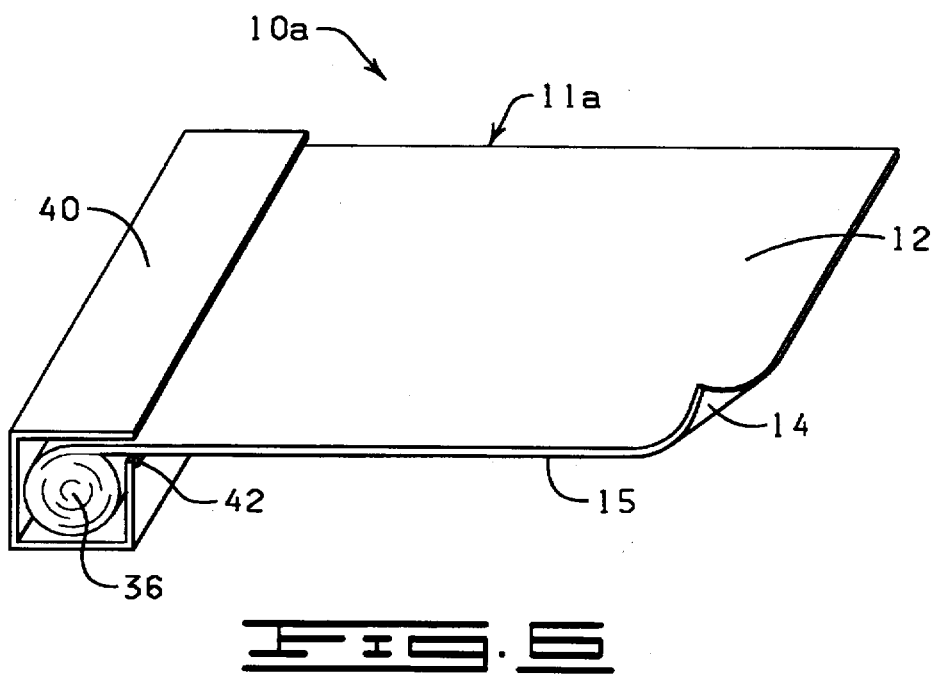

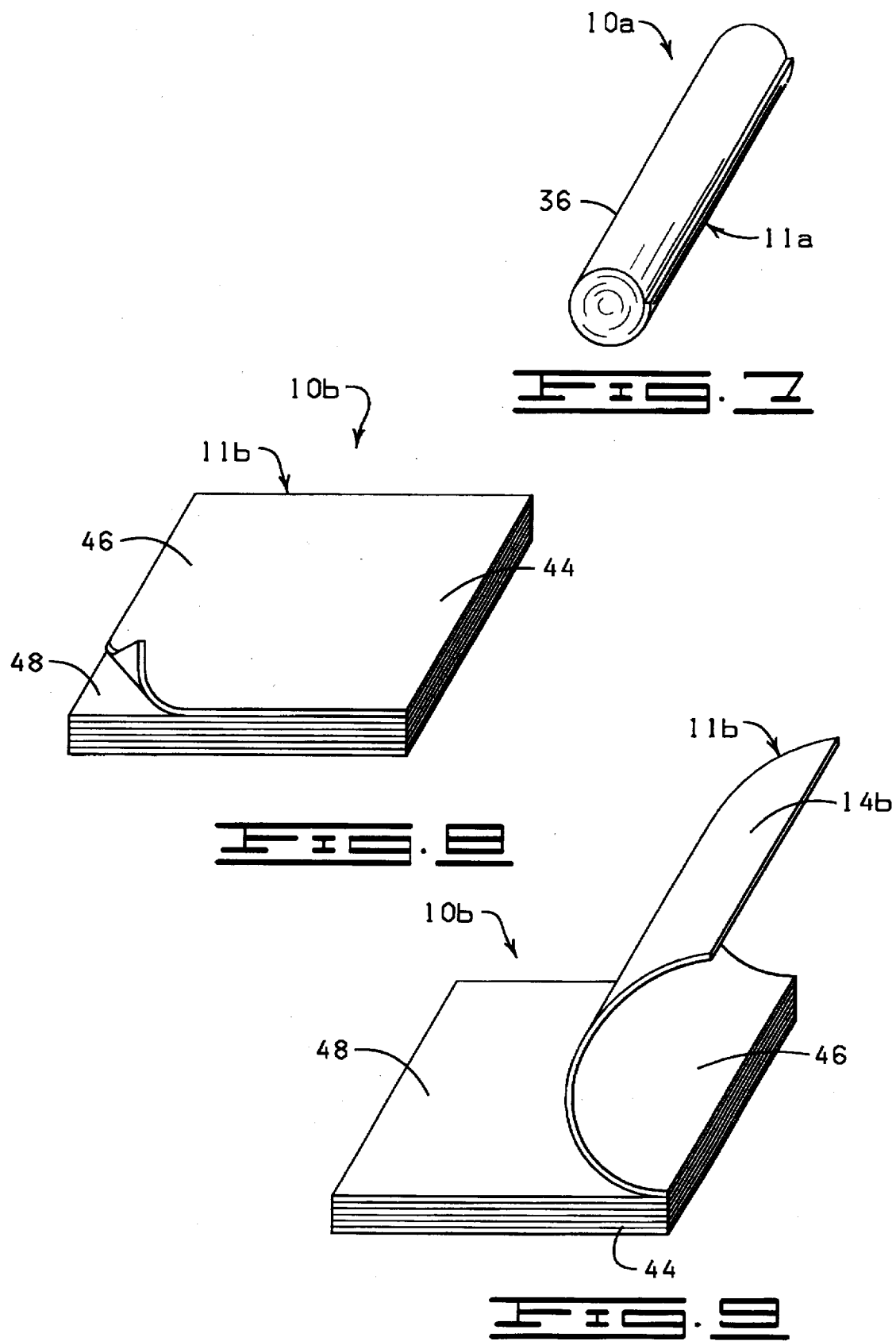

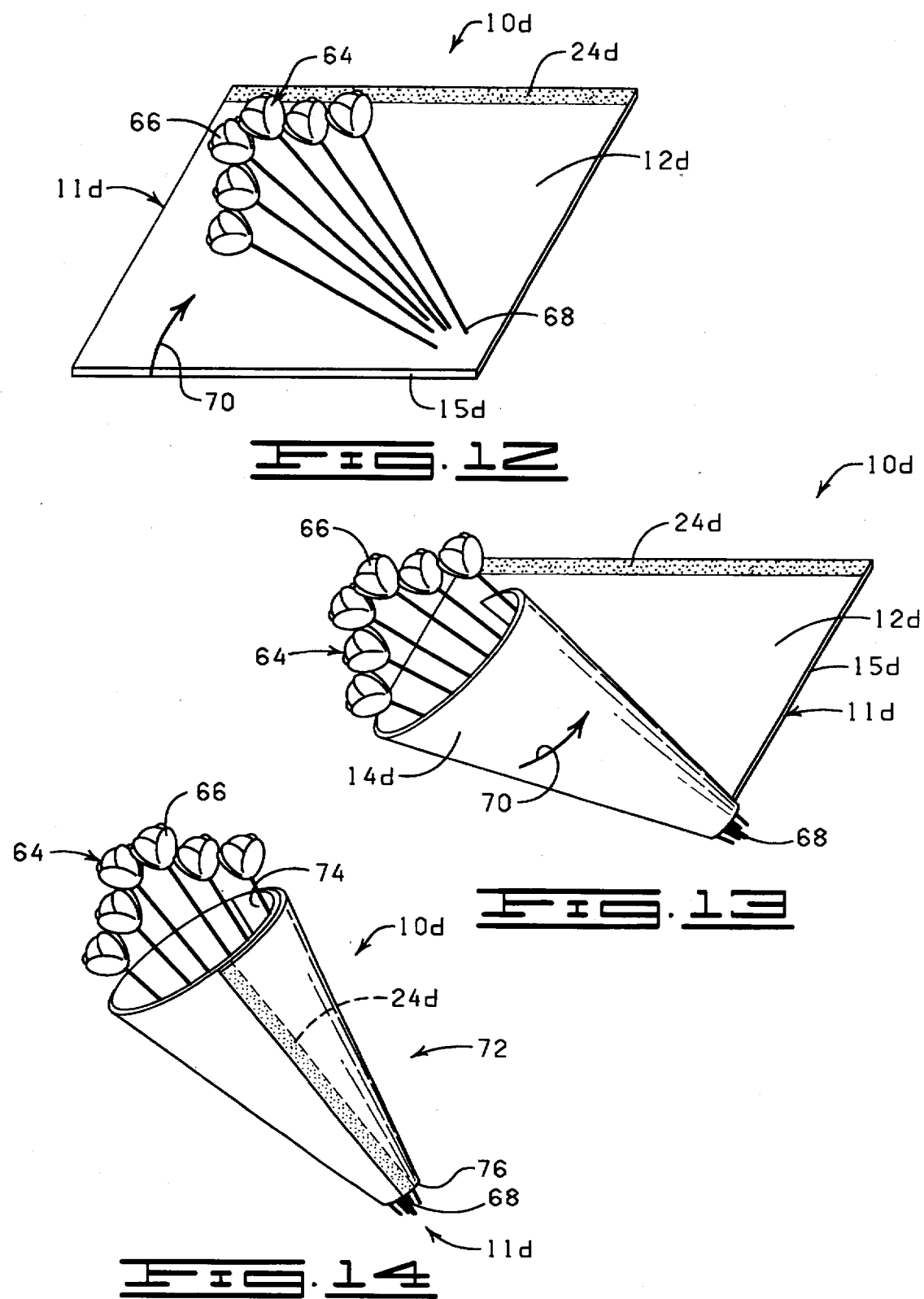

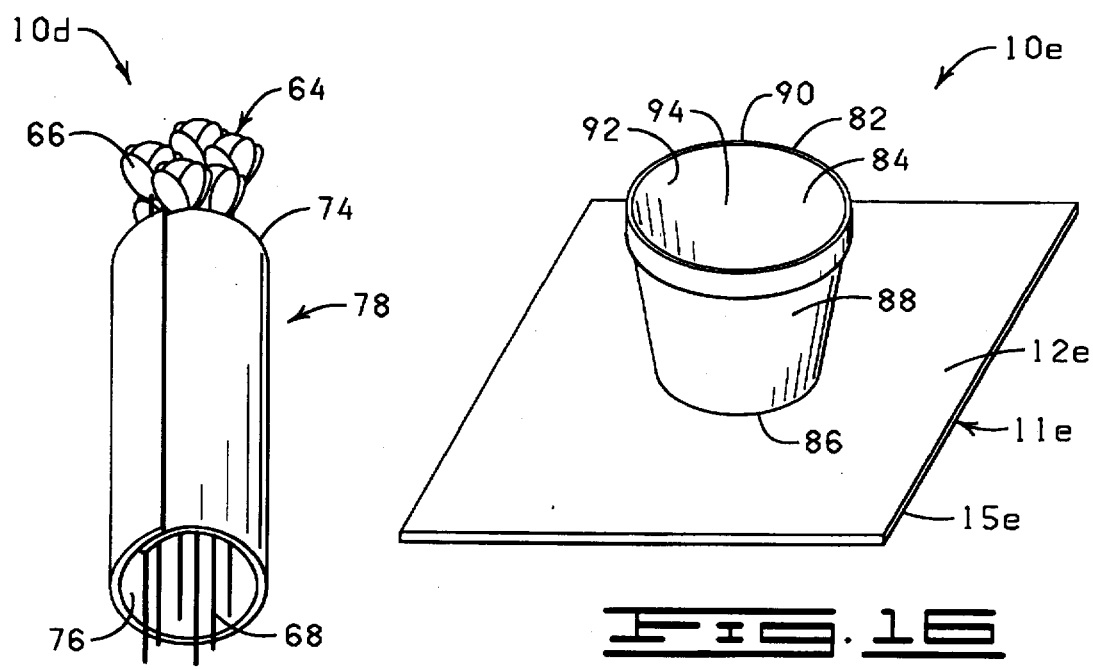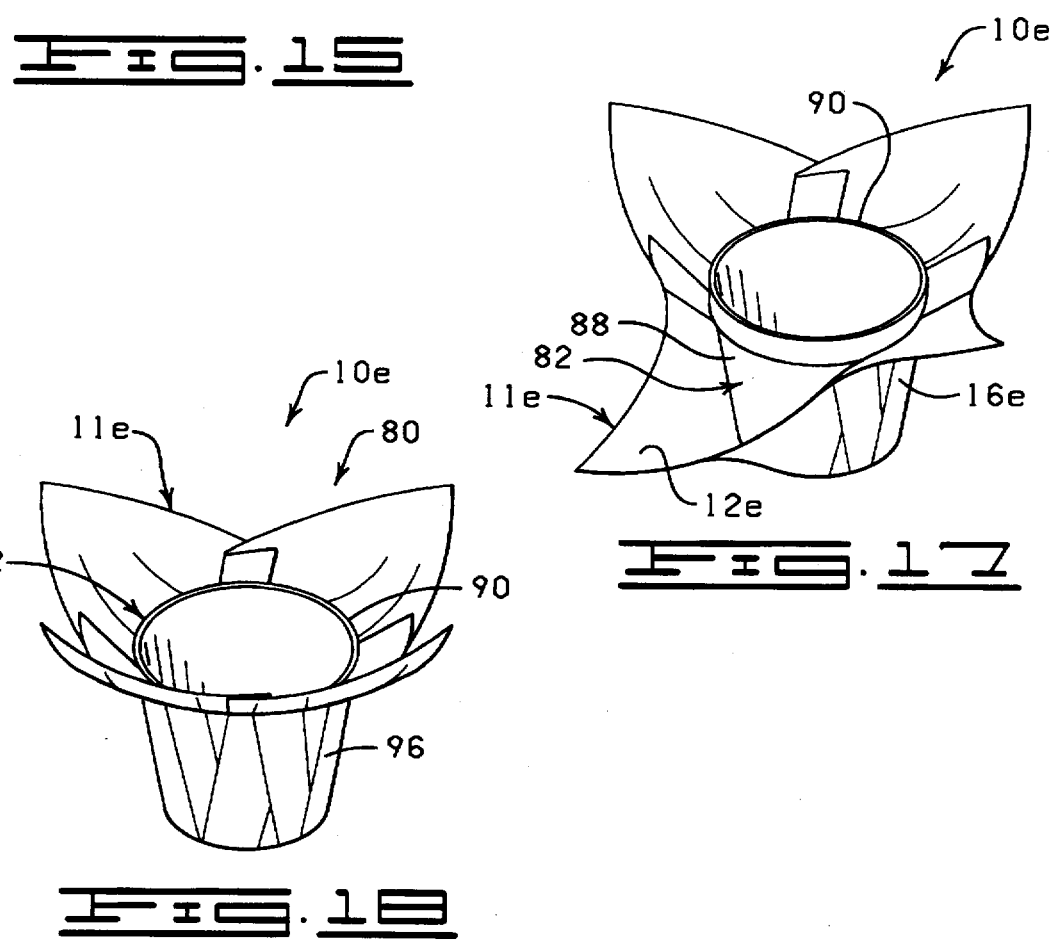

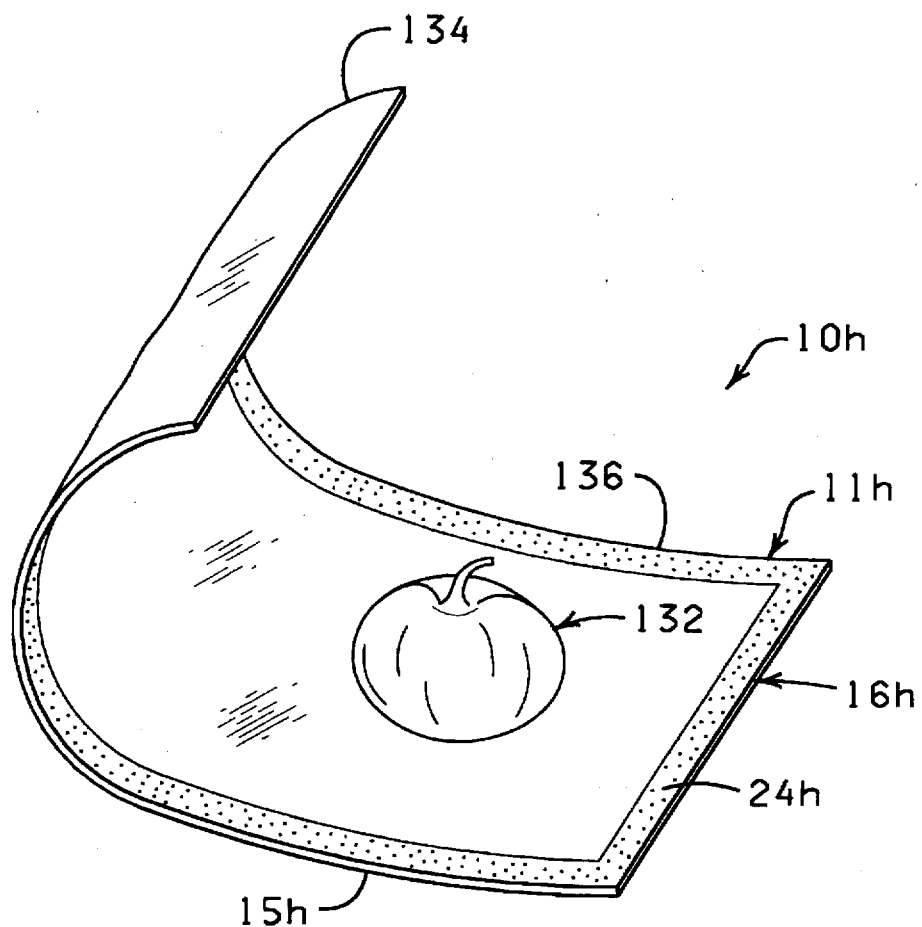
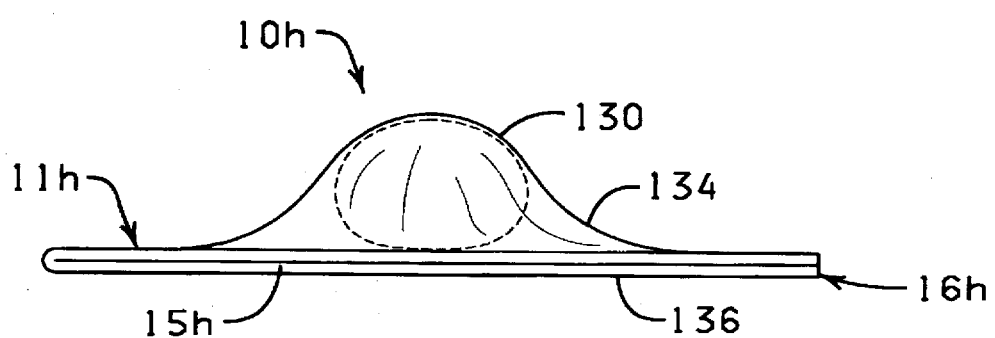

FLORAL WRAPPER UTILIZING A BREATHABLE PACKAGING MATERIAL

CROSS REFERENCE TO RELATED APPLICATIONS

This application is a divisional of U.S. Ser. No. 08/325,747, filed Oct. 19, 1994, entitled FLORAL WRAPPER UTILIZING A BREATHABLE PACKAGING SYSTEM; which is a continuation-in-part of U.S. Ser. No. 08/188,183, filed Jan. 28, 1994, entitled METHOD FOR WRAPPING AN OBJECT WITH AN EMBOSSED MATERIAL HAVING AN ADHESIVE THEREON, now U.S. Pat. No. 5,388,386; which is a continuation of U.S. Ser. No. 07/968,798, filed Oct. 30, 1992, entitled, METHOD AND APPARATUS FOR COVERING PORTIONS OF AN OBJECT WITH A SHEET OF MATERIAL HAVING A PRESSURE SENSITIVE ADHESIVE COATING APPLIED TO AT LEAST A PORTION OF AT LEAST ONE SURFACE OF THE SHEET OF MATERIAL, now U.S. Pat. No. 5,369,934; which is a continuation of U.S. Ser. No. 07/865,563, filed Apr. 9, 1992, entitled, METHODS FOR WRAPPING A FLORAL GROUPING, now U.S. Pat. No. 5,245,814; which is a continuation of U.S. Ser. No. 07/649,379, filed Jan. 31, 1991, entitled METHOD FOR WRAPPING AN OBJECT WITH A MATERIAL HAVING PRESSURE SENSITIVE ADHESIVE THEREON, now U.S. Pat. No. 5,111,638; which is a continuation of U.S. Ser. No. 07/249,761, filed Sept. 26, 1988, entitled METHOD FOR WRAPPING AN OBJECT WITH A MATERIAL HAVING PRESSURE SENSITIVE ADHESIVE THEREON, now abandoned.

Said application Ser. No. 08/325,747 is also a continuation-in-part of U.S. Ser. No. 08/253,648, filed Jun. 3, 1994, entitled WRAPPING A FLORAL GROUPING WITH SHEETS HAVING ADHESIVE OR COHESIVE MATERIAL APPLIED THERETO, now abandoned; which is a continuation of U.S. Ser. No. 07/965,585, filed on Oct. 23, 1992, entitled WRAPPING A FLORAL GROUPING WITH SHEETS HAVING ADHESIVE OR COHESIVE MATERIAL APPLIED THERETO, now abandoned; which is a continuation of U.S. Ser. No. 07/893,586, filed Jun. 2, 1992, entitled WRAPPING A FLORAL GROUPING WITH SHEETS HAVING ADHESIVE OR COHESIVE MATERIAL APPLIED THERETO, now U.S. Pat. No. 5,181,364; which is a continuation of U.S. Ser. No. 07/707,417; filed May 28, 1991, entitled WRAPPING A FLORAL GROUPING WITH SHEETS HAVING ADHESIVE OR COHESIVE MATERIAL APPLIED THERETO, now abandoned; which is a continuation of U.S. Ser. No. 07/502,358, filed Mar. 29, 1990, entitled WRAPPING A FLORAL GROUPING WITH SHEETS HAVING ADHESIVE OR COHESIVE MATERIAL APPLIED THERETO, now abandoned; which is a continuation-in-part of U.S. Ser. No.07/249,761, filed Sep. 26, 1988, entitled METHOD FOR WRAPPING AN OBJECT WITH A MATERIAL HAVING PRESSURE SENSITIVE ADHESIVE THEREON, now abandoned.

Said application Ser. No. 08/325,747 is also a continuation-in-part of U.S. Ser. No. 08/108,093 filed Aug. 17, 1993, entitled ARTICLE FORMING SYSTEM, now U.S. Pat. No. 5,472,752; which is a continuation of U.S. Ser. No. 08/024,573, filed Mar. 1, 1993, entitled ARTICLE FORMING SYSTEM, now abandoned; which is a continuation of 07/464,694, filed Jan. 16, 1990, entitled ARTICLE FORMING SYSTEM, now U.S. Pat. No. 5,208,027; which is a continuation of U.S. Ser. No.07/219,083, filed Jul. 13, 1988, entitled ARTICLE FORMING SYSTEM, now U.S. Pat. No. 4,897,031; which is a continuation of U.S. Ser. No.07/004,275, filed Jan. 5, 1987, entitled ARTICLE FORMING SYSTEM, now U.S. Pat. No. 4,773,182; which is a continuation of U.S. Ser. No. 06/613,080, filed May 22, 1984, entitled ARTICLE FORMING SYSTEM, now abandoned.

FIELD OF THE INVENTION

This invention relates to decorative material and particularly, material having a controlled atmosphere which permits a defined permeability of specific substances and/or gases, said material also having substances which inhibit both excessive moisture and/or substances which inhibit the growth of microorganisms, said material used to wrap objects, and methods of using same.

BRIEF DESCRIPTION OF THE DRAWINGS

FIG. 1 is a perspective view of the breathable packaging material constructed in accordance with the present invention showing the upper surface, a corner of the sheet of material turned back for illustration purposes only to show the lower surface.

FIG. 2 is a top plan view of the upper surface of the first sheet of material constructed in accordance with the present invention, the upper and lower surfaces being identical.

FIG. 3 is perspective view of the upper surface of a modified sheet of material similar to the sheet of material of FIG. 1 but showing a round aperture formed in the center of the sheet of material, the round aperture covered by a round second sheet of material sized slightly larger than the round aperture, the second sheet of material connected to the sheet of material.

FIG. 4 cross sectional view of FIG. 3 taken at 4—4 showing the second sheet of material 34 connected to and covering the round aperture in the sheet of material.

FIG. 5 is a perspective view of a plurality of sheets of material constructed in accordance with the present invention forming a continuous roll of sheets, the sheets separated by perforations, and the roll partially unrolled to reveal a single sheet still attached thereto.

FIG. 6 is a perspective view showing a roll of breathable packaging material wherein the roll of breathable packaging material is disposed in a dispenser for separating the roll into separate sheets of material and dispensing the separate sheets of material from the roll of breathable packaging material.

FIG. 7 is a perspective view showing a roll of breathable packaging material wherein the roll comprises a single sheet of material.

FIG. 8 is a perspective view of a pad of sheets of breathable packaging material constructed in accordance with the present invention, showing an edge of the top sheet lifted, exposing the next sheet of material.

FIG. 9 is a perspective view of the pad of sheets of breathable packaging material shown in FIG. 8, but showing the top sheet of material being detached from the next sheet of material.

FIG. 12 is a perspective view of a floral grouping disposed on a sheet of breathable packaging material.

FIG. 13 is a perspective view of the floral grouping of FIG. 12 being wrapped in one method of wrapping.

FIG. 14 is a perspective view of the floral grouping of FIGS. 12 and 13 wrapped in a conical fashion.

FIG. 15 is a perspective view of another method of using a sheet of breathable packaging material to wrap a floral grouping in a cylindrical fashion.

FIG. 16 is a perspective view of another embodiment of the sheet of breathable packaging material of the present invention shown with a pot disposed upon the sheet of material.

FIG. 17 is a perspective view of the sheet of breathable packaging material of FIG. 16, but showing the sheet of material partially wrapped about the flower pot.

FIG. 18 is a perspective view of the sheet of breathable packaging material of FIGS. 16 and 17 wrapped about a flower pot.

FIG. 29 is a perspective view of yet another embodiment of the present invention, showing a modified sheet of material similar to the sheet of material shown in FIG. 1, the modified sheet of material being transparent and having a bonding material disposed about the periphery, an apple disposed near the first side of the sheet of material, a portion of the sheet of material starting to overlap the apple.

FIG. 30 an elevational side view of the sheet of material and apple shown in FIG. 30, but showing the sheet of material overlapping and sealing to itself, thereby sealing the apple therein, forming a breathable package.

DESCRIPTION OF THE PREFERRED EMBODIMENTS

The Embodiments of FIGS. 1–4

Figure 10:
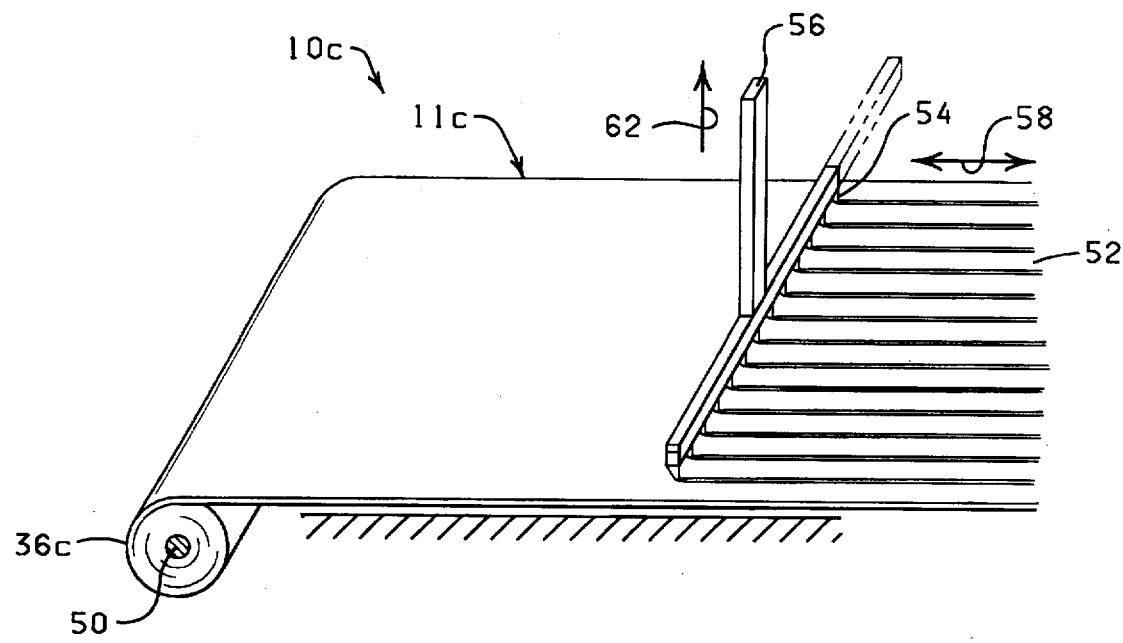
FIG. 10 is a perspective view of a roll of breathable packaging material constructed in accordance with the present invention, showing a knife edge being actuated by an actuator to cut at least a portion of the roll of breathable packaging material into elongated strips of breathable packaging material.

Several disadvantages exist in providing a wrapping or packaging for fresh flowers. These same drawbacks also apply to providing a wrapping for fresh produce and/or food. Further, many of these same disadvantages also apply to providing a wrapping for medical supplies/equipment, and for a wrapping or packaging for pharmaceutical products.

In the case of a floral grouping, for example, it is desirable to have a wrapping which permits a flow of a selected atmosphere to the packaged floral grouping. Such wrapping/packaging further would often use desiccants thereon or therein to reduce excess moisture, so that the growth of likelihood of unwanted microorganisms is reduced. Along this same line, such packaging further frequently would have antimicrobial agents incorporated therein or disposed thereon to reduce and/or eliminate unwanted microorganisms, such as, but not by way of limitation, fungi, bacteria, algae, and the like. Such an invention would also include non-fogging agents, so that the item packaged would remain clearly seen through such packaging.

The present invention contemplates a breathable packaging material comprising a sheet of material having at least portions thereof which permit selective control of the atmosphere to which the contents are exposed (termed "controlled atmosphere" materials and/or "controlled atmosphere characteristics"), that is, the material is permeable to some elements, substances and/or compositions (in either liquid or gaseous form), but impermeable to others. Further, the sheet of material incorporates therein and/or has disposed thereon a desiccant and/or an antimicrobial agent. In this manner such items as floral groupings, fresh produce, food, pharmaceutical products, and/or medical supplies/equipment may be packaged such that the item contained therein is maintained in the most commercially viable manner, and for an ideal or more controlled length of time.

Turning now to FIG. 1, designated therein by the general reference numeral 10 is a breathable packaging material. The breathable packaging material 10 comprises a sheet of material 11.

The sheet of material 11 has an upper surface 12, a lower surface 14, and an outer periphery 15. As shown in FIGS. 1 and 2, the outer periphery 15 further comprises a first side 16, a second side 18, a third side 20 and a fourth side 22.

A bonding material 24 may be disposed on the upper surface 12 of the sheet of material 11 (not shown). Alternatively, however, the sheet of material 11 may be free of a bonding material. The bonding material 24, if present, is disposed in one embodiment substantially over the upper surface 12 of the sheet of material 11. The bonding material 24 may also be disposed upon the upper surface 12 in a strip of bonding material 24, although the bonding material 24 also could be applied to the upper surface 12 of the sheet of material 11 in the form of spaced apart spots or the bonding material 24 also could be disposed on the upper surface 12 of the sheet of material 11 in any other geometric or non-geometric or asymmetric forms, and in any pattern, including fanciful patterns.

The sheet of material 11 has a thickness in a range from about 0.1 mils to about 10 mils. Frequently, the sheet of material has a thickness in a range from about 0.2 mils to about 3.5 mils. The sheet of material 11 is constructed of a material which is flexible.

The sheet of material 11 may be any shape and a rectangular shape is shown in FIG. 1 only by way of example. The sheet of material 11 for example only may be square, rectangular, circular or any other geometric, non-geometric, asymmetric or fanciful shape, such as, but by way of example only, heart shaped.

The sheet of material 11 may be constructed of a single layer of material or a plurality of layers of the same or different types of materials. The layers of material comprising the sheet of material 11 may be laminated together or connected together by any method described herein or known in the art.

The sheet of material 11 has a length 26 extending between the third and fourth sides 20 and 22, respectively, of the sheet of material 11. The sheet of material 11 also has a width 28 extending between the first and the second sides 16 and 18, respectively, of the sheet of material 11.

As noted earlier, a bonding material 24 may be disposed on the upper surface of the sheet of material 11, or, alternatively, to any other surfaces of any sheets of material described herein. The bonding material 24 may be applied as a strip or as spots or other shapes. One method for disposing a bonding material, in this case an adhesive, on a sheet of material is described in U.S. Pat. No. 5,111,637, entitled, "Method For Wrapping A Floral Grouping", issued to Weder et al. on May 12, 1992 and which is hereby incorporated herein by reference. Another method for disposing a bonding material in order to laminate two sheets of material is described in U.S. Pat. No. 4,297,811, entitled, "Laminated Printed Foil Flower Pot Wrap With Multicolor Appearance," issued to Weder on Nov. 3, 1981.

The term "bonding material" when used herein means an adhesive, possibly a pressure sensitive adhesive, or a cohesive. Where the bonding material is a cohesive, a similar cohesive material must be placed on the adjacent surface for bondingly contacting and bondingly engaging with the cohesive material. The term "bonding material" also includes materials which are heat sealable and, in this instance, the adjacent portions of the material must be brought into contact and then heat must be applied to effect the seal. The term "bonding material" when used herein also means a lacquer, which may be applied to the sheet of material and, in this instance, heat, sound waves, or vibrations, also must be applied to effect the sealing of the lacquer.

It will be appreciated that the sheet of material 11 may form a single or multiple sheets of material 64, pads of material, and/or rolls of material, the latter two being described in detail below. Further, the sheet of material 11 may consist of designs or decorative patterns which are printed, etched, and/or embossed thereon using inks or other printing materials. An example of an ink which may be applied to one or more surfaces of the sheet of material 11 is described in U.S. Pat. No. 5,147,706, entitled, "Water Based Ink On Foil And/Or Synthetic Organic Polymer", issued to Kingman on Sep. 15, 1992 and which is hereby incorporated herein by reference.

The sheet of material 11 may have various colorings, coatings, embossings, flocking and/or metallic finishes, or other decorative surface ornamentation applied separately or simultaneously or may be characterized totally or partially by pearlescent, translucent, transparent, iridescent or the like, qualities. Each of the above-named characteristics may occur alone or in combination and may be applied to the upper surface 12 and/or lower surface 14 of the sheet of material 11. Moreover, each surface of the sheet of material 11 may vary in the combination of such characteristics. The sheet of material 11 may be opaque, translucent, clear, tinted transparent, or any combination thereof.

The bonding material 24 may be used to laminate two or more sheets of material 11 together and may also be tinted or colored by using a dye, pigment, or ink. In this manner, different coloring effects are provided, and the multiple sheets of material 11 may be given a colored appearance by use of a colored bonding material 24. U.S. Pat. No. 5,147,706 described immediately above provides one water based ink which may be used to tint one or more sheets of material 11 or which may be used to tint the bonding material 24.

In a preferred embodiment, the sheet of material 11 is a plastic material constructed from a plastic film having controlled atmosphere characteristics, that is, a film which is permeable to some substances and/or gases, but impermeable to others. Such a plastic film is available from Hercules Incorporated, Hercules Plaza, Wilmington, Del. 19894. Different plastic films, or combination of films, may be utilized according to contents of the package and the controlled atmosphere desired within such packages, as described in detail below.

Controlled atmosphere film and methods of making said films are disclosed and described in detail in U.S. Pat. No. 4,842,875, entitled, "Controlled Atmosphere Package", issued to H. Anderson on Jun. 27, 1989; U.S. Pat. No. 4,879,078, entitled, "Process For Producing Uniaxial Polyolefin/Filler Films For Controlled Atmosphere Packaging", issued to M. Antoon, Jr. on Nov. 7, 1989; U.S. Pat. No. 4,910,032, entitled, "Water-Permeable Controlled Atmosphere Packaging Device From Cellophane and Microporous Film", issued to M. Antoon, Jr. on Mar. 20, 1990; U.S. Pat. No. 4,923,650, entitled, "Breathable Microporous Film And Methods For Making It", issued to M. Antoon, Jr. et al. on May 8, 1990; U.S. Pat. No. 5,011,698, entitled, "Breathable Microporous Film And Methods For Making It", issued to M. Antoon, Jr., et al. on Apr. 30, 1991; U.S. Pat. No. 5,045,331, entitled, "Container For Controlled Atmosphere Packaging", issued to M. Antoon, Jr. on Sep. 3, 1991; U.S. Pat. No. 5,160,768, entitled, "Curable Silicone-Coated Microporous Films For Controlled Atmosphere Packaging", issued to M. Antoon, Jr. on Nov. 3, 1992; and U.S. Pat. No. 5,254,401, entitled, "Packaging Material For Controlled Atmosphere Packaging", issued to R. Kelch et al. on Oct. 19, 1993, all of which are hereby specifically incorporated by reference herein.

The sheet of material 11 is constructed from any suitable wrapping material which is formed and manufactured to provide a controlled atmosphere, or which incorporates those features to a controllable degree from one or more other materials. Further, the sheet of material 11 must be capable of being wrapped about a flower pot or floral grouping, used as a sleeve or wrapper for a flower pot and/or floral grouping, including, but not by way of limitation, a single item, such as a single flower, a single item of produce, or a single medical supply/equipment. Further, the sheet of material 11 may be used as a shredded decorative material, such as, but not by way of limitation, confetti, decorative grass, tinsel, glitter, sequins, flakes, and the like. Further, the sheet of material 11 must also be suitable for making small die-cut items, such as decals, labels, stickers, stars, and the like. Frequently, the sheet of material 11 comprises plastic film, but the sheet of material may comprise paper (the term "paper" as used herein means treated or untreated paper, corrugated paper or cardboard or any other form of paper material), cellophane, foil, metallized film, fabric (woven or nonwoven or synthetic or natural), burlap, or combinations thereof.

The term "plastic film" as used herein means a film comprising a thermo-plastic resinous material, such as, but not by way of limitation, a polymer such as, for example only, a polypropylene. The term "plastic film" as used herein also means a film comprising a naturally occurring polymer such as cellophane. A plastic film, as contemplated and described in detail herein, is relatively strong and not as subject to tearing (substantially non-tearable), as might be the case with paper or foil.

The sheet of material 11 also has a desiccant 30 which is disposed upon and/or incorporated in the sheet of material 11. Such desiccants include, for example, but not by way of limitation, calcium chloride and silica gel. It will be understood that a number of desiccants are known to those having ordinary skill in the art, and it will be appreciated that the precise amount of desiccant(s) disposed on or incorporated in the sheet of material 11 is dependent upon the results sought and the items to be packaged therein. Generally, moisture will be reduced in the packaged item due to the contact of the sheet of material 11 with the item until such time as the desiccant 30 is substantially dissipated from the sheet of material 11. The duration of action of the desiccant 30 will depend, in part, upon the desiccant(s) used, the concentration of the desiccant(s) used, and the exposure of the of the desiccant(s) to atmospheric conditions.

The sheet of material 11 also has an antimicrobial agent 32 disposed thereon and/or incorporated therein. The term "antimicrobial agent" as used herein means an agent possessing antifungal properties, antibacterial (bacteriostatic or bacteriocidal) properties, and/or antimicrobial properties. "Antimicrobial agent(s)" inhibits and/or prevents the growth of antifungal properties on articles such as a floral grouping, fresh produce, and medical equipment or supplies. Antimicrobial agents which may be utilized with various materials are disclosed and described in detail in U.S. Pat. No. 3,044,885, entitled, "Impregnated Sheets For Preserving Perishable Foodstuffs", issued to B. Loehr on Jul. 17, 1962; U.S. Pat. No. 3,493,464, entitled, "Fungus-Resistant Paper Containing Metallic Quinolinolate Formed In Situ And Process Thereof" issued to A. Bowers et al. on Feb. 3, 1970; U.S. Pat. No. 3,653,873, entitled, "Ethylenic Sulfilimine Compositions For Controlling Fungi, Bacteria and Algae", issued to H. Bayer on Apr. 4, 1972; U.S. Pat. No. 3,728,213, entitled, "Antibiotic Paper", issued to C. Hinz on Apr. 17, 1973; U.S. Pat. No. 3,864,468, entitled, "Activated Polymer Materials and Process For Making Same", issued to S. Hyman et al. on Feb. 4, 1975; U.S. Pat. No. 3,959,556, entitled, "Antimicrobial Blended Yarns and Fabrics Comprised of Naturally Occurring Fibers", issued to W. Morrison on May. 25, 1976; U.S. Pat. No. 3,998,944, entitled, "Fungicidal Paper", issued to W. Long on Dec. 21, 1976; U.S. Pat. No. 4,008,351, entitled, "Film Or Sheet Material Having Antibacterial And Antifungal Activities", issued to M. Inoue et al. on Feb. 15, 1977; U.S. Pat. No. 4,111,922, entitled, "Hydrophilic Random Interpolymer From Quaternary Ammonium Monomers And Method For Making Same", issued to C. Beede et al. on Sep. 5, 1978; U.S. Pat. No. 4,343,853, issued to W. Morrison on Aug. 10, 1982; U.S. Pat. No. 4,401,712, entitled, "Antimicrobial Non-Woven Fabric", issued to W. Morrison on Aug. 30, 1983; U.S. Pat. No. 4,533,435, entitled, "Antimicrobial Paper", issued to H. Intili on Aug. 6, 1985; U.S. Pat. No. 4,663,077, entitled, "Microbiocidal Compositions Comprising An Aryl Alkanol And A Microbiocidal Compound Dissolved Therein", issued to N. Rei et al. on May 5, 1987; U.S. Pat. No. 4,666,706, entitled, "Delayed Release Insecticidal Composition And Method Of Making Same", issued to R. Farquharson et al. on May 19, 1987; U.S. Pat. No. 4,743,448, entitled, "Organic Carrier With Integrated Active Substances", issued to M. Bahadir et al. on May 10, 1988; U.S. Pat. No 4,888,175, entitled, "Aseptic Packaging" issued to K. Burton, Jr. et al. on Dec. 19, 1989, and U.S. Pat. No. 5,242,052, entitled, "Antimicrobial Material And Methods", issued to D. Weder on Sep. 7, 1993, all of which are hereby specifically incorporated by reference herein.

It will also be understood that many antimicrobial agents are known in the art. It will further be appreciated that the precise amounts of antimicrobial agent(s) 32 used is dependent upon the results sought and the items to be packaged. Generally, microorganisms will be eliminated or inhibited in the packaged item due to the contact of the sheet of material 11 with the item until such time as the antimicrobial agent is substantially dissipated from the sheet of material 11. The duration of action of the agent(s) 32 will depend, in part, upon the agent(s) used, the concentration of the agent(s) used, and the exposure of the of the agent(s) to atmospheric conditions.

The sheet of material 11 may also have a non-fogging agent (not shown) disposed thereon or incorporated therein. It will be appreciated that non-fogging agents are known in the art. It will further be appreciated that the precise amounts of non-fogging agents used is dependent upon the results sought and the items to be packaged. Generally, fogging of the packaging will be eliminated or inhibited in the packaged item due to the contact of the sheet of material 11 with the item until such time as the non-fogging agent is substantially dissipated from the sheet of material 11. The duration of action of the agent will depend, in part, upon the agent(s) used, the concentration of the agent(s) used, and the exposure of the of the agent(s) to atmospheric and/or packaged conditions.

The antimicrobial agent 32, the desiccant 30, the non-fogging agent and/or the bonding material 24 may be disposed upon the sheet of material 11 by any method known in the art, including, but not by way of limitation, spraying, brushing, immersing the sheet of material in the antimicrobial agent 32, desiccant 30 and/or bonding material 24, and (in the case of the antimicrobial agent 32, the desiccant 30 and/or the non-fogging agent) exposure of the sheet of material 11 to agent-containing gas and/or desiccant-containing gas, or mixing and/or incorporating the desiccant 30 and/or the non-fogging agent and/or the antimicrobial agent 32 in a dye, pigment, ink, lacquer, or any combination thereof, or any other medium, which is then applied to the sheet of material 11. Further, it will be understood that the bonding material 24, the desiccant 30, the non-fogging agent and/or the antimicrobial agent 32 may be disposed upon or incorporated in any item such as, but not by way of limitation, tape, labels, stickers, decals, and the like, and then applied to the sheet of material 11. It will be appreciated that the entire sheet of material 11 may be treated in the manner described immediately above, or, alternatively, only a portion thereof may be treated. The antimicrobial agent, the non-fogging agent and/or the desiccant may also be incorporated into the sheet of material 11 before or during formation of the sheet of material 11.

The desiccant 30, the non-fogging agent and/or the antimicrobial agent 32 may also be mixed with or incorporated in the bonding material 24, the bonding material 24 then being disposed upon at least a portion of the sheet of material 11. Methods for such mixing and/or incorporation are know in the art, as are methods for disposing bonding material on sheet material. The desiccant 30, the non-fogging agent and/or the antimicrobial agent may also be mixed with or incorporated into a lacquer, the lacquer then being disposed upon at least a portion of the sheet of material 11.

The desiccant 30, the non-fogging agent and/or the antimicrobial agent 32 may alternatively be disposed upon the sheet of material 11 via microcapsules. Suitable microcapsules and methods which may be utilized with the above-referenced materials (i.e., desiccants, antimicrobial agents, non-fogging agents and/or bonding materials) are disclosed and described in detail in U.S. Pat. No. 4,990,381, entitled, "Multi-Layer Sandwich Sheet and Packaging Using The Said Sheet", issued to G. Holzner on Feb. 5, 1991; U.S. Pat. No. 4,988,557, entitled, "Fragrance Sampling Device", issued to J. Charbonneau on Jan. 29, 1991; U.S. Pat. No. 4,925,517, entitled, "Method Of Forming Fragrance Releasing Pull-Apart Sheets", issued to J. Charbonneau et al. on May 15, 1990; U.S. Pat. No. 4,848,929, entitled, "Volatile Emitting Container", issued to H. Rawl on Jul. 18, 1989; U.S. Pat. No. 4,769,264, entitled, "On Page Fragrance Sampling Device", issued to R. Dreger on Sep. 6, 1988; U.S. Pat. No. 4,661,388, entitled, "Pad Fragrance Sampling Device" issued to J Charbonneau on Apr. 28, 1987; U.S. Pat. No. 4,606,956, entitled, "On Page Fragrance Sampling Device", issued to J. Charbonneau et al. on Aug. 19, 1986; and U.S. Pat. No. 4,528,226, entitled, "Stretchable Microfragrance Delivery Article", issued to N. Sweeny on Jul. 9, 1985, all of which are hereby specifically incorporated by reference herein.

It will be appreciated that the desiccant 30, the antimicrobial agent 32, the non-fogging agent and/or the bonding material 24 may cover a substantial portion of one or more surfaces of the sheet of material 11. Alternatively, the antimicrobial agent 32, the non-fogging agent, the desiccant 30, and/or the bonding material 24 may cover only limited portions of the sheet of material 11. The desiccant 30, the non-fogging agent and/or antimicrobial agent 32 may be applied to a second sheet of material 34, this second sheet of material then connecting to the sheet of material 11. Turning to FIGS. 3 and 4, the sheet of material 11 as shown is FIGS. 1-2 is illustrated, but with a round aperture 33 therein. The round aperture 33 is covered by a second sheet of material 34, which is also round, and which has an outer periphery which is slightly larger than the circumference of the round aperture 33.

It will be appreciated that the second sheet of material 34 has all of the structures defined for the sheet of material 11. It will be appreciated that a plurality of second sheets of material 34 having any one or any combination of antimicrobial agents 32, desiccants 34, non-fogging agents and/or bonding material 24 may be applied to the sheet of material 11 (not shown). It will further be understood that the sheet of material 11 may be free of bonding material 24 and/or desiccants 30 and/or non-fogging agents and/or antimicrobial agents 32, wherein only one or more second sheets of material 34 have at least one of the latter described features, the second sheets of material 34 being connected to the sheet of material 11 (not shown).

Embodiments of FIGS. 5-7

Referring now to FIG. 5, a modified sheet of material 11a is shown. The sheet of material 11b is identical to the sheet of material 11 shown in FIGS. 1-4 and described in detail previously, except that the sheet of material 11a is formed into a plurality of individual sheets of material 11a which are connected linearly together to form a roll 36. Preferably, the plurality of sheets of material 11a in the roll 36 are connected by perforations 38, as illustrated in FIG. 5. Such a roll 36 permits one sheet of material 11a to be withdrawn from the roll 36, then severed or disconnected from the roll 36. Alternatively, the roll 36 may simply be formed as a continuous roll 36 of material without perforations (not shown), wherein a plurality of sheets of material 11a may be removed from the roll 36 by unrolling a portion of the roll 36, and using a separate cutting element (not shown) to sever the unrolled portion of the roll 36 of material to form the sheet of material 11a. The roll 36 may also be contained within a dispenser 40, as illustrated in FIG. 6. When the roll 36 is disposed in the dispenser 40, a portion of the material is again unrolled, and a serrated cutting edge 42 contained within the dispenser 40, or a separate cutting element (not shown), severs the unrolled portion of the material from the roll 36 to form a sheet of material 11a. Any number of sheets of material 11a may form a roll 36 as long as it is possible to withdraw at least one sheet of material 11a from the roll 36 as described herein. A roll 36 formed by one sheet of material is shown in FIG. 7.

Embodiments of FIGS. 8-9

Shown in FIG. 8 is a modified sheet of material 11b which is identical to the sheet of material 11 shown in FIGS. 1-4 and described in detail previously, except that the sheet of material 11b is formed into a plurality of sheets of material 11b which are stacked and aligned one on top of the other to form a pad 44 of sheets of material 11b.

The pad 44 comprises a top sheet 46 having a next sheet 48 disposed directly thereunder, with additional sheets of material 11b disposed under the next sheet 48, all sheets collectively forming the pad 44 of sheets of material 11b (one edge of the top sheet 46 lifted for illustration purposes only in FIG. 8). The sheets of material 11b are generally aligned, and are connected together via a bonding material (not shown), such as, but not by way of limitation, a pressure sensitive adhesive.

When the top sheet 46 of material 11b is lifted and removed from the pad 44, as shown in FIG. 9, the next sheet 48 becomes the new top sheet 46, and the sheet directly below the new top sheet 46 becomes the new next sheet 48. This process is repeated, until all of the sheets of material 11b in the pad 44 are removed.

In operation, a floral grouping or flower pot may be placed on the top sheet 46 in the pad 44 and the top sheet 46 may be wrapped about the floral grouping or flower pot and removed from the pad 44. Methods and means for forming a pad, using the sheets of material to wrap floral groupings, and removing sheets from a pad are known in the art. Methods of both forming a pad and wrapping floral groupings with sheets of material from a pad are described in U.S. Pat. No. 5,181,364, entitled, "Wrapping A Floral Grouping With Sheets Having Adhesive Or Cohesive Material Applied Thereto", issued to Weder on Jan. 26, 1993, which is hereby incorporated by reference herein.

Figure 11:
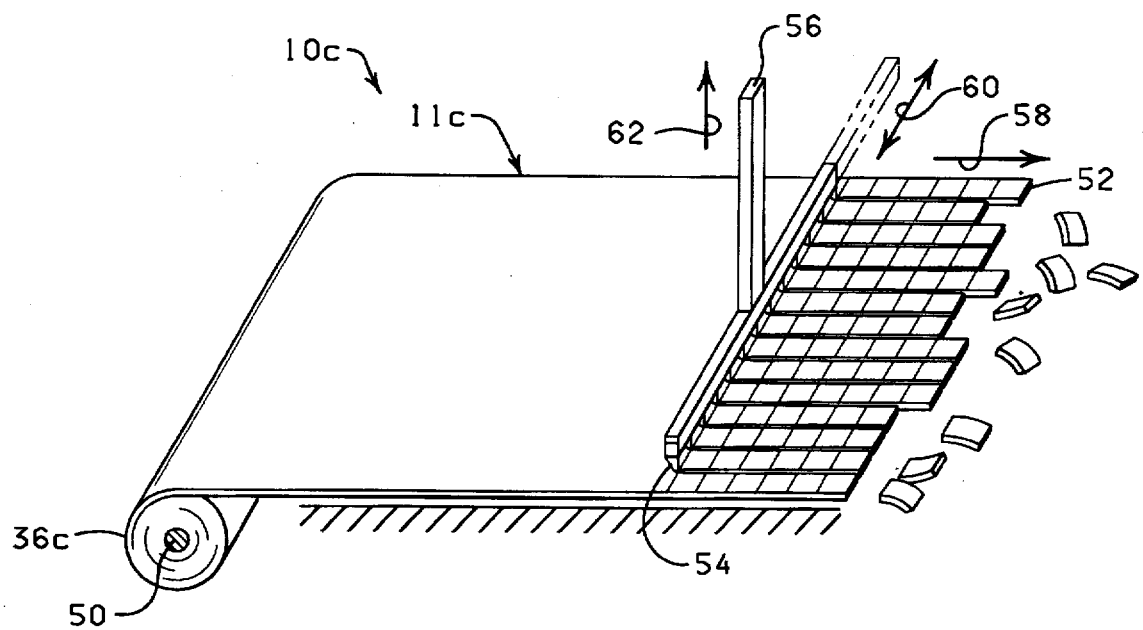
FIG. 11 is a perspective view of the roll of breathable packaging material of FIG. 10, but showing the knife edge being actuated in a second direction, to cut the elongated strips of breathable packaging material into small pieces of breathable packaging material.

Embodiments of FIGS. 10-11

Shown in FIG. 10 is a modified roll 36c of breathable packaging material 10c which comprises at least a first sheet of material 11c. The roll 36c of breathable packaging material 10c is constructed exactly like the roll 36 of breathable packaging material 10a and the sheet of material 11 shown in FIGS. 1–4 and 10c described in detail previously, except that the roll 36c of material 10c is not disposed in a dispenser constructed like the dispenser 40c shown in FIG. 6. Rather, the roll 36c of breathable packaging material 10c is supported on a generally mounted shaft 50. The sheet of material 11c is withdrawn from the roll 36c of breathable packaging material 10c via a leading edge 52 until a predetermined length of the breathable packaging material 10c has been withdrawn from the roll 36c of breathable packaging material 10c. In this position, a portion of the breathable packaging material 10c is disposed under a knife edge 54 having a plurality of edges. The knife edge 54 is connected to an actuator 56 adapted to move the knife edge 54 in a first shredding direction 58 and in a second direction 60. When the predetermined length of the breathable packaging material 10c has been withdrawn from the roll 36c of breathable packaging material 10c, the actuator 56 actuates to move the knife edge 54 in the first direction 58 to a position wherein the knife edge 54 severingly engages the breathable packaging material 10c to shreddingly cut a plurality of elongated portions of the breathable packaging material 10c from the roll 56c of breathable packaging material 10c. In another optional mode, the actuator 56 may then turn the knife edge 54 to a second direction 60 wherein the knife edge 54 severingly reengages the plurality of elongated portions of the breathable packaging material 10c, thereby causing the elongated portions of the breathable packaging material 10c to be severed into small (or long) pieces, for use as glitter, sequins, labels, decals, confetti, tinsel, decorating grass, and the like (it will be appreciated that this process is represented schematically in the drawings), as shown in FIG. 11. The actuator 56 may comprise a hydraulic or pneumatic cylinder or a motor and gear arrangement or any other form of arrangement suitable for moving the knife edge 54 in the directions 58 and 60. After the knife edge 54 has cuttingly severed the desired portion of sheet of breathable packaging material 10c from the roll 36c of breathable packaging material 10c, the actuator 56 is actuated to move the knife edge 54 in the storage direction 62 to a storage position disposed a distance above the breathable packaging material 10c as opposed to the cutting position previously described. Alternatively, the leading edge 52 may be run across a first knife edge 54 (not shown) set in the surface to form the elongated strips of breathable packaging material 10c, wherein the actuator 56 actuates a second knife edge (not shown) to cross-cut the elongated strips of breathable packaging material 10c into small pieces. Apparatus and methods for making decorative shredded materials and the like is disclosed in U.S. Pat. No. 4,646,388, entitled, "Apparatus For Producing Weighed Charges Of Loosely Aggregated Filamentary Material", issued to Weder et al. on Mar. 3, 1987, which is hereby incorporated by reference herein.

Embodiments of FIGS. 12–15

Turning now to FIGS. 12–15, as noted previously, the sheet of material 11d may be used to wrap a floral grouping 64. "Floral grouping" as used herein means cut fresh flowers, artificial flowers, a single flower other fresh and/or artificial plants or other floral materials and may include other secondary plants and/or ornamentation or artificial or natural materials which add to the aesthetics of the overall floral arrangement. The floral grouping comprises a bloom (or foliage) portion 66 and a stem portion 68. However, it will be appreciated that the floral grouping 64 may consist of only a single bloom or only foliage (not shown). The term "floral grouping" may be used interchangeably herein with the term "floral arrangement"

In a method of use, a modified sheet of material 11d is provided, which is identical to the sheet of material 11 shown in FIG. 1 and described in detail previously, except that the sheet of material 11d has a strip of bonding material 24d disposed on the upper surface 12d and near the first side 16d of the sheet of material 11d, the strip extending between the third side 20d, and the fourth side 22d, of the sheet of material 11d.

A floral grouping 64 having a stem portion 68 and a bloom portion 66 (FIG. 12) is disposed on the upper surface 12d of the sheet of material 11d. The sheet of material 11d then is wrapped about the floral grouping 64 by taking the second side 18d, of the sheet of material 11d and rolling the sheet of material 11d in a direction 70 about the floral grouping 64 (FIGS. 12–13). The sheet of material 11d is continued rolled about the floral grouping 64 until a portion of the bonding material 24d is disposed adjacent a portion of the lower surface 14d of the sheet of material 11d and brought into bonding contact or engagement therewith (FIGS. 13–14) thereby bondingly connecting the bonding material 24d on the upper surface 12d of the sheet of material 11d to a portion of the lower surface 14d of the sheet of material 11d for cooperating to secure the sheet of material 11d in a wrapped condition about the floral grouping 64 to provide a wrapper 72 wrapped about the floral grouping 64, as shown in FIG. 14.

In the wrapped condition with the sheet of material 11d wrapped about the floral grouping 64 as shown in FIG. 14, the wrapper 72 forms a conical shaped with an opened upper end 74 and an opened lower end 76. The wrapper 72 covers a portion of the bloom portion 66 of the floral grouping 64. A portion of the stem portion 68 of the floral grouping 64 extends through the opened lower end 76 of the wrapper 72. The wrapper 72 is tightly wrapped about the stem portion 66 of the floral grouping 64. The bonding material 24d on the sheet of material 11d may contact and engage some of the stem portion 68 of the floral grouping 64 to cooperate in securing the wrapper 72 tightly wrapped about the stem portion 68 and to prevent the floral grouping 64 from slipping or moving within the wrapper 72.

At least a portion of the floral grouping 64 is disposed within the wrapper 72. In some applications, the stem portion 68 of the floral grouping 64 extends through the open lower end 76 of the wrapper 72, as described before. In other applications, the stem portion 68 does not extend through the open lower end 76 of the wrapper 72. In some applications, the wrapper 72 is tightly wrapped about the stem portion 68 of the floral grouping 64. The bloom portion 66 of the floral grouping 64 is disposed near the open upper end 74 of the wrapper 72 and the bloom portion 66 of the floral grouping 64 is visible via the open upper end 74 of the wrapper 72. In some instances, the bloom portion 66 of the floral grouping 64 may extend beyond the open upper end 74 of the wrapper 72. It will be appreciated that the open upper end 74 of the wrapper 72 may be closed by a flap (not shown) or any other method known in the art. Similarly, it will be understood that the open lower end 76 may be closed in the same manner as that described for the open upper end 74. It will be further appreciated that the floral grouping 64 may be sealed within the wrapper 72, or within any wrapper and/or package shown and/or described herein.

The wrapper 72, as shown in FIG. 14, is generally conically shaped. The sheet of material 11d may also be wrapped about the floral grouping 64 to form a cylindrically shaped wrapper 78 as shown in FIG. 15 or any other shape wrapper if desired in a particular application.

U.S. Pat. No. 5,181,364, entitled, "Wrapping A Floral Grouping With Sheets Having An Adhesive Or Cohesive Material Applied Thereto", issued to Weder et al. on Jan. 26, 1993, which has been incorporated by reference herein above, discloses methods of wrapping a floral grouping in a cylindrically-shaped wrapper.

Embodiments of FIGS. 16–20

Referring now to FIGS. 16–20, as noted above, a sheet of material 11 may be used to provide a decorative cover 80 for an object such as a flower pot 82 or a potted plant. The term "flower pot" refers to any type of container used for holding a floral grouping 64 or a potted plant. Examples of flower pots 82 used in accordance with the present invention include, but not by way of limitation, clay pots, plastic pots, wooden pots, pots made from natural and/or synthetic fiber, and the like.

The flower pot 82 has an open upper end 84, a closed lower end 86, and an outer peripheral surface 88. An opening 90 intersects the open upper end 84 forming an inner peripheral surface 92 and a retaining space 94.

A modified sheet of material 11e, identical to the sheet of material 11 shown in FIG. 1 is provided, except that the sheet of material 11e has either a bonding material 24e disposed substantially thereon, or is formed at least partially from a shape-sustaining material, or both. To cover the object, the sheet of material 11e may be manually or automatically formed about the outer peripheral surface 88 of the pot 82 or potted plant. Or, the sheet of material 11e may be formed into a preformed decorative cover 80 which is then placed about the outer peripheral surface 88 of the pot 82 or potted plant.

In a method of use, referring to FIGS. 16–18, to form a sheet of material 11e into a decorative cover 80 about a pot 82, both a flower pot 82 and a sheet of material 11e is provided. The pot 82 is disposed upon the upper surface 12e of the sheet of material 11e, so that the lower end 86 of the pot 82 rests upon a portion of the upper surface 12e.

In one embodiment of a manual application of the sheet of material 11e about the pot 82, the upper surface 12e of the sheet of material 11e is formed about the outer peripheral surface 88 of the pot 82 (FIGS. 17 and 18), thereby engaging the outer peripheral surface 88 of the pot 82 to form a decorative cover 80 about the pot 82 as shown in FIG. 18, in a manner which is known to those having ordinary skill in the art. The lower surface 14e of the sheet of material 11e thereby becomes the outer surface 96 of the decorative cover 80.

Another method for wrapping the sheet of material 11e about a pot 82 for forming such a decorative cover 80 is shown in U.S. Pat. No. 4,733,521, entitled, "Cover Forming Apparatus" issued to Weder et al., on Mar. 29, 1988, which is hereby incorporated herein by reference. A decorative cover 80 formed by wrapping the sheet of material 11e about the flower pot 82 may be secured to the outer peripheral surface 88 of the pot 82 by the use of one or more bonding materials described herein. One particular method of securing the decorative cover 80 to the pot 82 is by applying a band (not shown) about the pot 82 to hold the decorative cover 80 in place such as is described in U.S. Pat. No. 5,105,599, entitled "Means For Securing A Decorative Cover About A Flower Pot", issued to Weder on Apr. 21, 1992 and which is hereby incorporated herein by reference.

The term "band" when used herein means any material which may be secured about an object such as a flower pot, such bands commonly being referred to as elastic bands, rubber bands or non-elastic bands and also includes any other type of material such as an elastic or non-elastic string or elastic piece of material, non-elastic piece of material, a round piece of material, a flat piece of material, a ribbon, a piece of paper strip, a piece of plastic strip, a piece of wire, a tie wrap or a twist tie or combinations thereof or any other device capable of gathering the sheet of material to removably or substantially permanently form a crimped portion and secure the crimped portion formed in the sheet of material which may be secured about an object such as the flower pot. The band also may include a bow if desired in a particular application.

Figure 19:
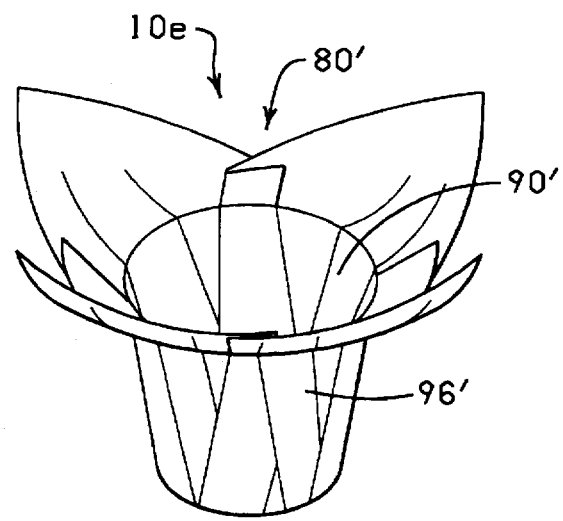
FIG. 19 is a perspective view of a pre-formed decorative pot cover formed from a sheet of breathable packaging material.
Figure 20:
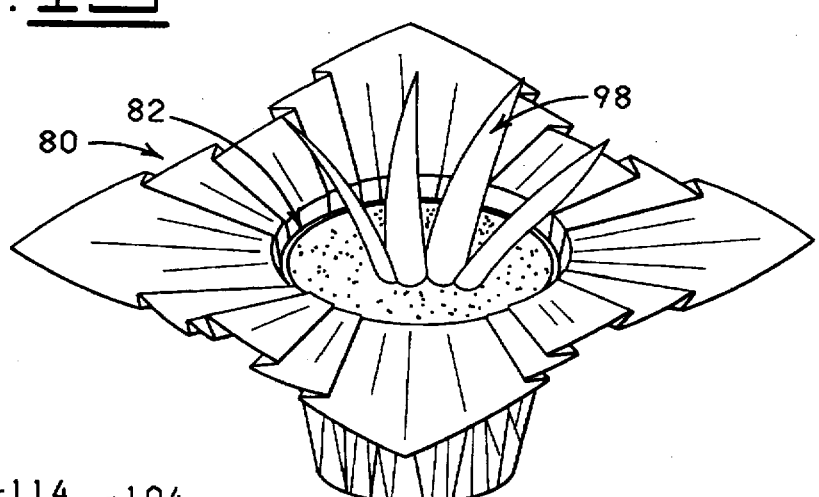
FIG. 20 is a perspective view of a potted plant, the pot substantially covered by the pre-formed decorative pot cover of FIG. 19.
Figure 21:
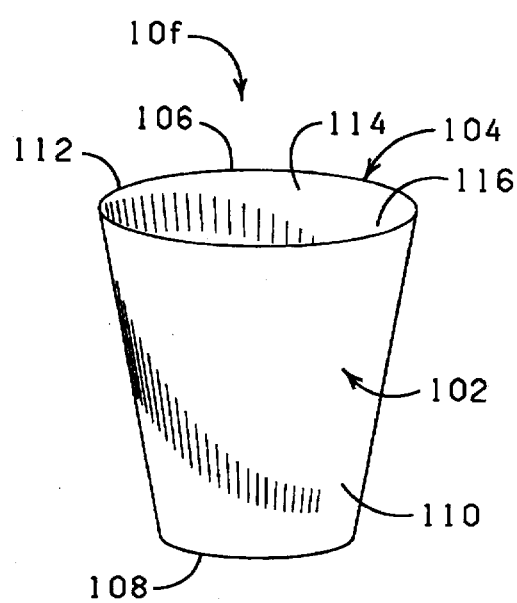
FIG. 21 is a perspective view of another embodiment of the sheet of material of FIG. 1 in accordance with the present invention, but showing a wrapper comprising a sleeve for wrapping a floral grouping, constructed in accordance with the breathable packaging material of the present invention.

Alternatively, the sheet of material 11e may be preformed into a decorative cover 80' having an opening 90' as shown in FIGS. 19–20. The decorative cover 80' is self-supporting by virtue of overlapping folds which are bonded to each other, thereby forming a rigid structure, as shown in FIGS. 19–20. It will be appreciated that the self-supporting decorative cover 80' has the same structural features as those previously described for a pot 82. A potted plant 98 can be disposed into the opening 90' of a preformed cover 80', thereby resulting in a decoratively covered potted plant 98 as shown in FIG. 21. Alternatively, the decorative preformed cover 80' may be used as a pot 82.

One method for forming such a preformed plant cover or pot cover is shown in U. S. Pat. No. 4,773,182, entitled, "Article Forming System", issued to Weder et al. on Sep. 27, 1988, which is hereby incorporated herein by reference.

The decorative cover, whether formed manually or by an automatic means known in the art or described herein, may be sealed about the pot 82 and floral grouping contained therein by gathering the edges of the decorative cover upward and sealing them together via a bonding material 24 or a band, thereby creating a sealed package (not shown). Alternatively, a sheet of material 11 as shown and described herein may be disposed over the floral grouping 64 and upper portion of the decorative cover 80, and may be connected to the decorative cover 80 by banding, bonding material, or any method or means known in the art (not shown).

The term "potted plant" as used herein means a plant having a bloom or foliage portion 66' and a stem portion 68' as well as a root portion (not shown), the root portion disposed in a growing medium 100. The term "potted plant" as used herein also includes botanical items and propagules.

The term "botanical item" when used herein means a natural or artificial herbaceous or woody plant, taken singly or in combination. The term "botanical item" also means any portion or portions of natural or artificial herbaceous or woody plants including stems, leaves, flowers, blossoms, buds, blooms, cones, or roots, taken singly or in combination, or in groupings of such portions such as bouquet or floral grouping.

The term "propagule"0 when used herein means any structure capable of being propagated or acting as an agent of reproduction including seeds, shoots, stems, runners, tubers, plants, leaves, roots or spores.

The term "growing medium" when used herein means any liquid, solid or gaseous material used for plant growth or for the cultivation of propagules, including organic and inorganic materials such as soil, humus, perlite, vermiculite, sand, water, and including the nutrients, fertilizers or hormones or combinations thereof required by the plants or propagules for growth.

The Embodiments of FIGS. 21–27

Shown in FIGS. 21–28 and designated therein by the general reference numeral 102 is a modified sheet of material forming a wrapper for a floral grouping, which is constructed from the sheet of material 11, shown in FIGS. 1–4 and described in detail herein previously. The wrapper 102 comprises a sleeve 104 which is generally tubular in shape. The sleeve 104 has a first end 106, a second end 108, an outer peripheral surface 110 and an opening 112 intersecting both the first end 106 and the second end 108, forming an inner peripheral surface 114 and providing a retaining space 116 therein. In some embodiments (not shown), the second end 108 is closed, forming a closed end (not shown), and the opening 112 only intersects the first end 106 of the sleeve 104. Sleeves, and their construction, are well known in the art and sleeves are commercially available, as are various devices and mechanisms capable of forming sleeves.

Figure 22:
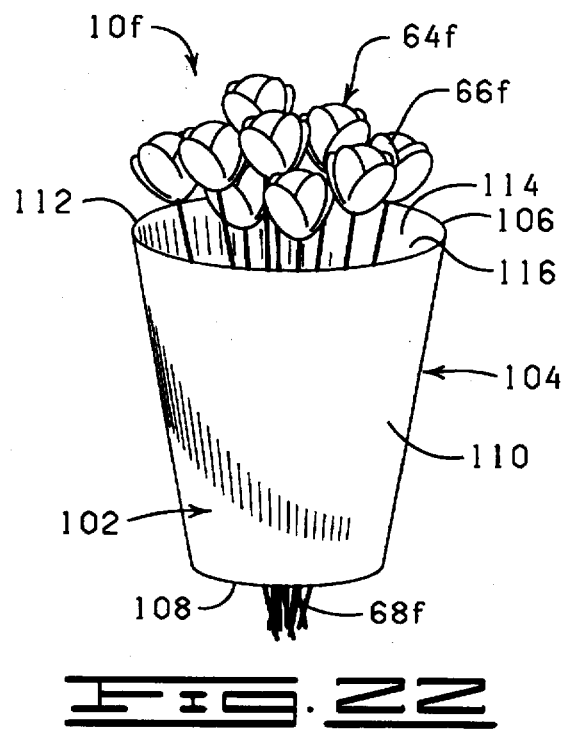
FIG. 22 is a perspective view of the wrapper of FIG. 21 but showing the floral grouping disposed inside of the wrapper with the bloom portion near the first end and the stem portion extending from the second end.

The wrapper 102 further comprises both the sleeve 104 and a floral grouping 64f (FIG. 22). The sleeve is adapted to receive a floral grouping 64f within the retaining space 116. The floral grouping 64f (FIG. 22) may be disposed in the opening 112 in the sleeve 104 and contained substantially in the receiving space 116 of the sleeve 104, as will be described in detail below.

Figure 24:
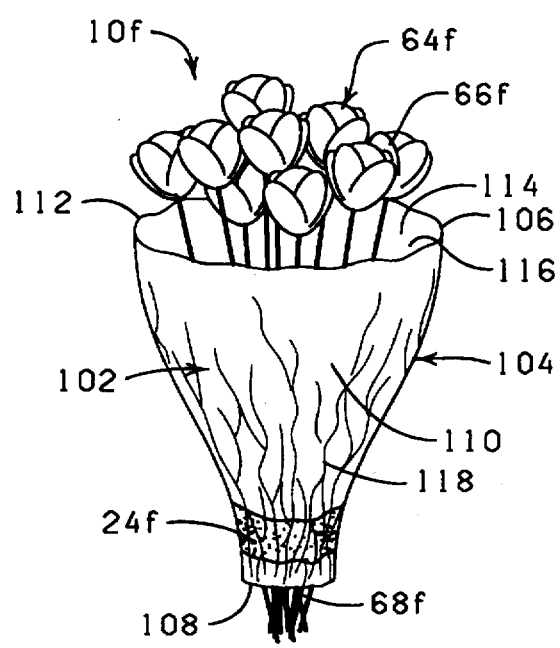
FIG. 24 is a perspective view of a modified wrapper similar to the wrapper shown in FIG. 23 but having the bonding material disposed on the outer surface of the sleeve, and showing the wrapper crimped about the stem portion of the floral grouping, the crimped portion forming overlapping folds.

A bonding material 24f may be disposed on at least a portion of the inner peripheral surface 114 of the sleeve 104 (not shown), or, alternatively, the bonding material 24f may be disposed on the outer peripheral surface 110 of the sleeve 104, as illustrated in FIG. 24, or, in a further alternative, the bonding material 24f may be disposed on both the inner peripheral surface 114 and the outer peripheral surface 110 of the sleeve 104 (not shown).

The bonding material 24f may further comprise a color, or a combination of colors, as previously described herein. Further, the bonding material 24f may comprise at least a portion of a design on the sleeve 104. "Designs," as used herein, are defined as any geometric form, or any combination of geometric forms, for example, squares, round spots, triangles, rectangles, octagonals, or the like (not shown). "Designs" are further defined as any non-geometric, asymmetrical or fanciful forms, or any combination thereof, for example, but not by way of limitation, hearts, balloons, flowers, lace, slogans, logos, print (any combination of letters and/or numbers), signs, human forms (real and fictional) animal forms (real and fictional), cartoon characters, and/or plant forms. It will be appreciated that such "designs" may be utilized on any embodiment shown and/or described herein.

Such a design may comprise a color, or a portion of a color, or any combination of colors. Alternatively, at least a portion of the design may be colorless, translucent, transparent, opaque, pearlescent, iridescent, or the like.

The sleeve 104 is generally tubularly shaped, but the sleeve 104 may be, by way of example but not by way of limitation, cylindrical, conical, frusto-conical, or a combination of both frusto-conical and cylindrical (not shown). Further, as long as the sleeve is capable of receiving a floral grouping 64f, any shape of sleeve 104, whether geometric, non-geometric, asymmetrical and/or fanciful, may be utilized.

Figure 23:
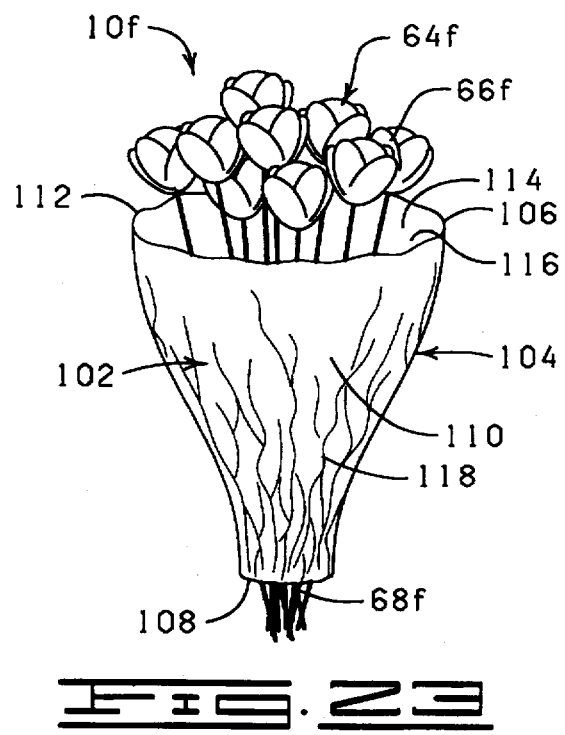
FIG. 23 is a perspective view of the wrapper of FIG. 22 but showing the wrapper crimped about the stem portion of the floral grouping, the crimped portion forming overlapping folds.

In a general method of use, illustrated in FIGS. 22–24, at least a portion of the floral grouping 64f is disposed within the sleeve 104. In some applications, the stem portion 68f of the floral grouping 64f extends into the sleeve 104 via the open first end 106, extending through the open second end 108 of the sleeve 104 and beyond the open second end 108. The bloom portion 66f of the floral grouping 64f is therefore disposed near the open first end 106 of the sleeve 104 and the bloom portion 66f of the floral grouping 64f is visible via the open first end 106 of the sleeve 104. (FIG. 22). In some instances, the bloom portion 66f of the floral grouping 64f may extend above the open first end 106 of the sleeve 104. In some applications, the first end 106 of the sleeve 104 may be closed if desired (not shown). In some circumstances, the second end 108 of the sleeve 104 may be closed if desired (not shown). It will be appreciated than when the sleeve 104 is closed at both the first end 106 and the second end 108, the sleeve 104 may be sealed about the floral grouping 64f therein, forming a breathable wrapper/package. In one method of use (FIGS. 21–24), an operator provides a sleeve 104 (FIG. 21), and a floral grouping 64f (FIG. 22). The operator then disposes the floral grouping 64f into the sleeve 104 by opening the sleeve 104 at the first end 106 and assuring both that the opening 112 therein is in an open condition, and that the inner peripheral surface 114 of the sleeve 104 is somewhat expanded outward as well, the retaining space 116 sized to receive the floral grouping 64f, as shown in FIG. 21. The operator then disposes the floral grouping 64f into the opening 112 in the sleeve 104 and the retaining space 116 by inserting first the stem portion 68f of the floral grouping 64f into the retaining space 116 of the sleeve 104 via the opening in the first end 106, in a manner which permits a portion of the stem portion 68f to be disposed in the retaining space 116 adjacent the second end 108 of the sleeve 104, the second end 108 generally having the narrowest diameter. In inserting the floral grouping 64f into the sleeve 104 in this manner, the bloom portion 66f is also disposed in the retaining space 116 of the sleeve 104 and the bloom portion 66f is disposed adjacent the first end 106 of the sleeve 104, the first end 106 having generally having the widest diameter. In this method, at least a portion of the stem portion 68f of the floral grouping 64f extends slightly beyond the second end 108 of the sleeve 104, and the bloom portion 66f of the floral grouping 64f is clearly visible at the open first end 112 of the sleeve 104, as shown in FIG. 22.

The sleeve 104 may then be crimped about the floral grouping 64f, as shown in FIGS. 23–24. The crimping operation is conducted by an operator after the floral grouping 64f is disposed in the sleeve 104 by crimping at least a portion of the sleeve 104 in the area of the stem portion 68f of the floral grouping 64f, at least a portion of the bonding material 24f being disposed on this area to retain the crimped sleeve 104 in the crimped condition. Such crimping may be conducted by hand, by grasping and substantially encompassing with one or more hands the second end 108 of the sleeve 104 in the area of the bonding material 24f and evenly and firmly squeezing that portion of the sleeve 104 about the area having the bonding material 24f, thereby pressing and gathering both the sleeve 104 and the bonding material 24f against itself and about the stem portion 68f of the floral grouping 64f. The sleeve 104 may also be crimped by using both a crimping motion (as described above) and a turning motion to create a twisted crimping, resulting in a sleeve 104 which is both crimped as previously described, and which is twisted about at least a portion of the stem portion 68f of the floral grouping 64f, the sleeve 104 near the stem portion 68f being rotated for example but not by way of limitation, about the stem portion 68f between about one-eighth of a turn to about a full turn (not shown).

When the sleeve is crimped, a plurality of overlapping folds are formed in the crimped area. The plurality of overlapping folds 118 (only one overlapping fold designated by the numeral 118) resulting from the gathered, crimped material of the sleeve 104 may be connected, that is, all portions of the overlapping breathable packaging material 10f of the sleeve 104 are bondingly connected together via bonding material 24f. A plurality of overlapping folds 118 may be formed by hand, during crimping, or by mechanical means. Such mechanical means are disclosed generally in "Article Forming System,"0 which has been previously incorporated by reference herein. Alternatively, the crimping may be conducted in a manner in which not all of the plurality of overlapping folds 40 are bondingly connected together. It will be appreciated that the plurality of overlapping folds 118 (connected or unconnected) are formed primarily in the crimped area. Such crimping as described above may also be conducted by any device or mechanism known in the art and used for gathering or crimping materials.

Alternatively, the sleeve may remain uncrimped. The bonding material 24f disposed upon the sleeve 104 may cause the sleeve 104 to bondingly connect to portions of itself, causing the sleeve 104 to conform, either generally, or closely (depending, as will be appreciated, upon the amount of bonding material 24f and the amount of the breathable packaging material 10f of the sleeve 104 which overlaps and connects to itself) to the floral grouping 64f.

When the floral grouping 64f is disposed in the sleeve 104 by any method described herein or known in the art, the sleeve 104 substantially surrounds and encompasses a substantial portion of the floral grouping 64f. When the sleeve 104 is disposed about the floral grouping 64f, the sleeve 104 forms a wrapper 72 which provides breathable packaging (breathable wrapper/package) for the floral grouping 64f contained therein.

It will be appreciated that the sleeve 104 has sufficient flexibility but also sufficient rigidity to both remain in and sustain its general shape, thereby substantially surrounding and encompassing the floral grouping 64f.

Figure 25:
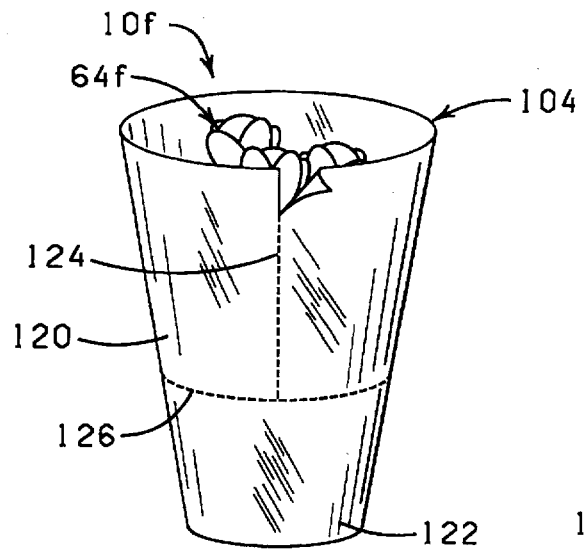
FIG. 25 is a perspective view of another embodiment of the present invention, showing a wrapper comprising a sleeve for covering a flower pot, the vertical perforations torn at the upper portion of the sleeve.
Figure 26:
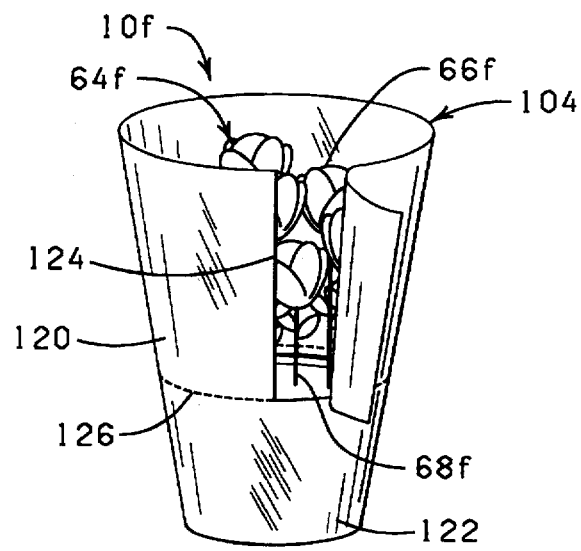
FIG. 26 is a perspective view of the wrapper of FIG. 25, but showing the vertical perforation torn open and the circumferential perforations being torn.
Figure 27:
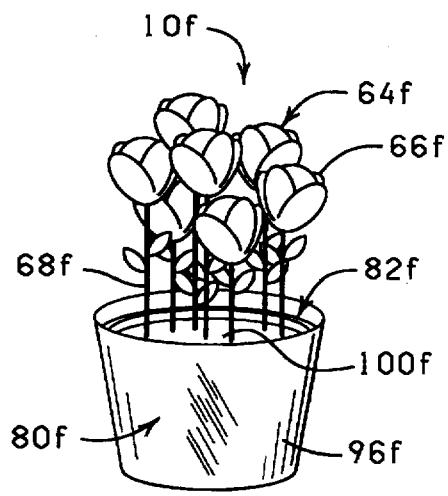
FIG. 27 is a perspective view of the wrapper of FIGS. 25 and 26, but showing the upper portion torn away and the remaining lower portion of the sleeve forming a decorative cover about the pot.

As illustrated in FIGS. 25–27, the sleeve 104 may also extend over the outer peripheral surface 88f of a flower pot 82f. The sleeve 104 may comprise at least a portion of a decorative cover 80 (if the upper portion 120 of the sleeve 104 tears away from the lower portion 122 of the sleeve 104 via vertical perforations 124 and/or circumferential perforations 126 extending about the sleeve 104 near or above the level of the open upper end 84f of the pot 82f, as illustrated in FIGS. 25–27) or, alternatively, the sleeve 104 may extend over a pot 82f already covered by a decorative cover (not shown), the sleeve 104 often being torn away from the decorative cover 80f after shipment and delivery (not shown). The sleeve 104 may have a bonding material 24f disposed thereupon such that the second end 108 of the sleeve 104 will connect to the pot 82f (not shown). Alternatively, a bonding material 24f may be disposed upon the outer peripheral surface 88f of the flower pot (not shown). In a further alternative, the bonding material 24f may be disposed on both the pot 82f and the sleeve 104 (not shown). The flower pot 82f may contain a floral grouping 64f disposed therein.

It will be appreciated that the method of disposing a flower pot 82f into the sleeve 104 is generally substantially similar to the method described above for disposing a floral grouping 64f into a sleeve 104.

It will be further understood that the sleeve 104 may be sealed about the pot 82f with floral grouping 64f therein. The sleeve may comprise a closed upper portion 120 (not shown). Similarly, the sleeve 104 may seal to the pot 82 via a bonding material as previously described, or the sleeve may comprise a closed lower portion 122 (not shown). Or, alternatively, the upper portion 120 of the sleeve 104 may be sealed to itself above the level of the floral grouping 64f via any method of means described herein or known in the art (not shown). Such a sealed sleeve 104 forms a breathable package and/or wrapper about the pot 82f/floral grouping 64f combination.

Figure 28:
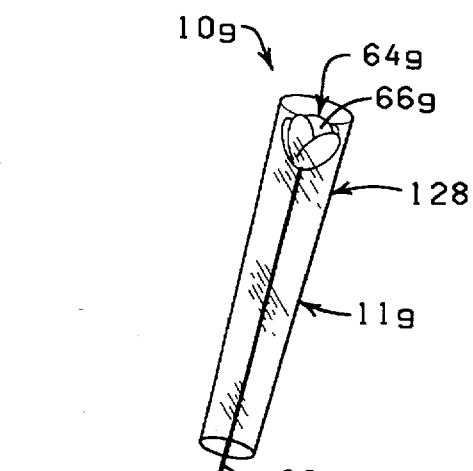
FIG. 28 is a perspective view of still another embodiment of the present invention, showing a wrapper for a floral grouping, wherein the wrapper is sized to wrap a single bloom.

The Embodiment of FIG. 28

Shown in FIG. 28 and designated therein by the general reference numeral 128 is a single flower wrapper formed from a modified sheet of material 11g for a floral grouping constructed from the sheet of material 11f, as shown in either FIG. 1–4 or FIGS. 21–27 and described in detail herein previously. In this example, the wrapper 128 is identical to the sleeve 104g above, except that the wrapper 128 is a narrow tubular shape which is constructed to accommodate a floral grouping 64g comprising generally only a single bloom portion 66g and stem portion 68g. It will be appreciated that the wrapper may comprise a single sheet of material, or a plurality of sheets of material.

The method of use of the wrapper 128 is identical to the method of use shown in FIGS. 21–24. If a single sheet of material is used, the method of use is identical to that shown for FIGS. 12–15 and described in detail herein above.

The Embodiments of FIGS. 29–30

Shown in FIGS. 29–30 and designated therein by the general reference numeral 11h is a modified sheet of material forming a breathable package 130 for fresh produce 132, the sheet of material 11h being constructed exactly like the sheet of material 11, shown in FIGS. 1–4 and described in detail herein previously, except that the sheet of material 11h is transparent, and except that the sheet of material 11h has a bonding material 24h disposed near the outer periphery 15h of the sheet of material 11h.

In a method of use, the above-referenced sheet of material 11h is provided, as is at least one item of fresh produce, in this instance, an apple. "Fresh produce", as used herein, includes, but not by way of limitation, fresh vegetables, meat, fruit, dairy products, and the like. "Food" as used herein means any edible item. At least one item of fresh produce 132 is placed on the upper surface 12h of the sheet of material 11h, as shown in FIG. 29, the item being disposed near the first side 16h of the sheet of material 11h.

A portion of the sheet of material 11h is shown overlapped over the item of fresh produce 132 (termed the overlapping portion 134), and the bonding material 24h of the overlapping portion of the sheet of material 11h is then aligned with the non-overlapping portion 136 of the sheet of material 11h upon which the item of fresh produce 132 rests. The bonding material 24h of the overlapping portion is then brought into contact and sealed to the bonding material 24h of the non-overlapping portion of the sheet of material 11h as shown in FIG. 30, thereby sealing the item of fresh produce 132 within the sheet of material 11h, forming a breathable package 130. It will be appreciated that medical supplies/equipment (not shown) may be wrapped in a similar manner. It will further be understood that other similar as well as dissimilar methods of wrapping fresh produce and/or medical equipment/supplies are known in the art. "Medical supplies/equipment" as used herein means any disposable or non-disposable item, such as, but not by way of limitation, forceps, sutures, bandages, retractors, and the like.

Further, is will be understood that pharmaceutical products may be wrapped in a similar manner. It will further be understood that other similar as well as dissimilar methods of wrapping pharmaceutical products are known in the art. "Pharmaceutical products" as used herein includes, but is not limited to, capsules, tablets, containers containing pharmaceutical products, and the like.

It will be understood that any embodiment shown and/or described herein, or portion of any embodiment, may be combined with any other embodiment or portion thereof as illustrated and/or described herein. Similarly, it will be appreciated that any method shown and/or described herein, or any step or portion of any method may be combined with any other method or steps thereof shown and/or described herein. To this end, it will be appreciated that all materials and methods for wrapping, forming decorative covers, forming wrappers, and the like shown and/or described herein may comprise or be formed into breathable packages, i.e., packages having controlled atmosphere characteristics.

Changes may be made in the construction and the operation of the various components, elements and assemblies described herein or in the steps or the sequence of steps of the methods described herein without departing from the spirit and scope of the invention as defined in the following claims.

What is claimed is:

1. A method for packaging an item with a breathable packaging material, comprising the steps of:
   providing an item having an outer periphery;
   providing a breathable packaging material, comprising
      a sheet of material having an upper surface, a lower surface and an outer periphery, the sheet of material having controlled atmosphere characteristics such that the sheet of material is permeable to some gases while impermeable to other gases, the sheet of material further comprising a desiccant, an antimicrobial agent, a non-fogging agent and a bonding material selected from the group consisting of an adhesive and a cohesive, said bonding material disposed on at least a portion of one surface of the sheet of material;
   wrapping the sheet of material about the item; and sealing the item in the sheet of material, thereby forming a breathable package.

2. The method of claim 1, wherein in the step of providing an item, the item comprises a floral grouping.

3. The method of claim 1, wherein in the step of providing an item, the item comprises a flower pot.

4. The method of claim 3, wherein the flower pot contains at least a portion of a floral grouping.

5. The method of claim 1, wherein in the step of providing an item, the item comprises fresh produce.

6. The method of claim 1, wherein in the step of providing an item, the item comprises medical supplies/equipment.

7. The method of claim 1, wherein in the step of providing an item, the item further comprises food.

8. The method of claim 1, wherein in the step of providing an item, the item further comprises a pharmaceutical product.

* * * * *

UNITED STATES PATENT AND TRADEMARK OFFICE
CERTIFICATE OF CORRECTION

PATENT NO. : 5,666,784

DATED : September 16, 1997

INVENTOR(S) : Donald E. Weder

Page 1 of 5

It is certified that error appears in the above-identified patent and that said Letters Patent is hereby corrected as shown below:

IN the drawings:

Sheet 7 of 10, Figure 19, please shorten the reference character line for 90' as illustrated in the drawing below:

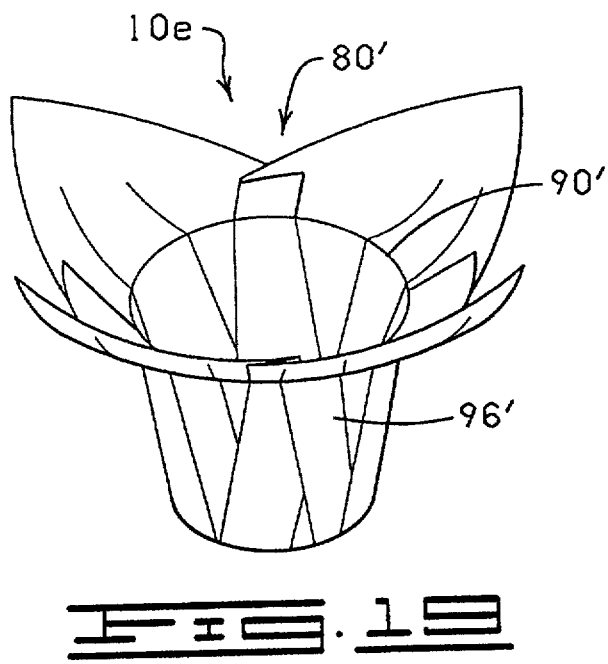

UNITED STATES PATENT AND TRADEMARK OFFICE
CERTIFICATE OF CORRECTION

PATENT NO. : 5,666,784
DATED : September 16, 1997
INVENTOR(S) : Donald E. Weder

It is certified that error appears in the above-identified patent and that said Letters Patent is hereby corrected as shown below:

Sheet 7 of 10, Figure 20, please insert the prime sign to reference character 80 as illustrated in the drawing below:

Sheet 7 of 10, Figure 20, please insert the reference character --90'-- as illustrated in the drawing below:

Sheet 7 of 10, Figure 20, please insert the reference character --100-- as illustrated in the drawing below:

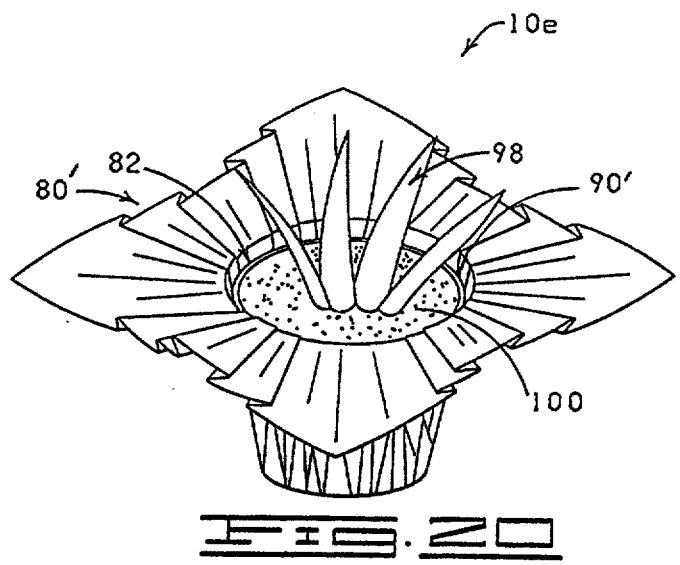

UNITED STATES PATENT AND TRADEMARK OFFICE
CERTIFICATE OF CORRECTION

PATENT NO. : 5,666,784

DATED : September 16, 1997

INVENTOR(S) : Donald E. Weder

It is certified that error appears in the above-identified patent and that said Letters Patent is hereby corrected as shown below:

Sheet 10 of 10, Figure 29, please insert the reference character --12h-- as illustrated in the drawing below:

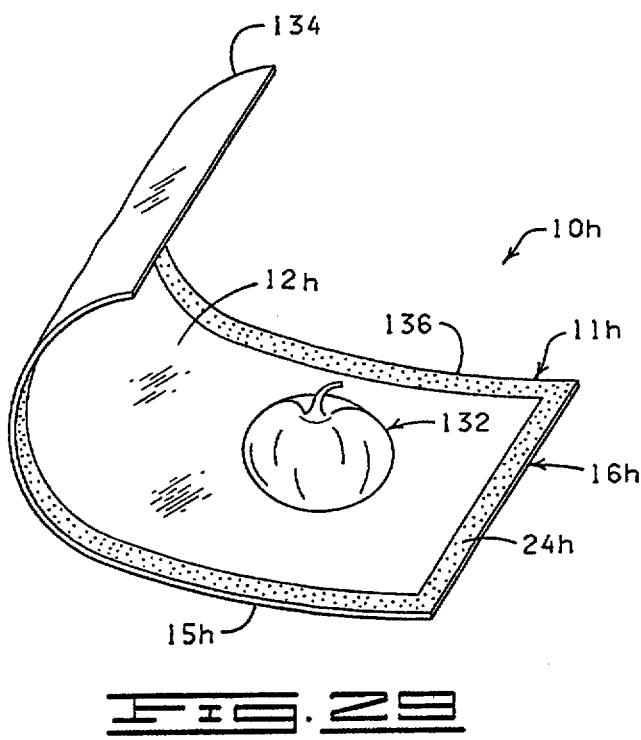

UNITED STATES PATENT AND TRADEMARK OFFICE
CERTIFICATE OF CORRECTION

PATENT NO. : 5,666,784
DATED : September 16, 1997
INVENTOR(S) : Donald E. Weder

It is certified that error appears in the above-identified patent and that said Letters Patent is hereby corrected as shown below:

Column 5, line 55, please delete "64", and substitute therefor --11--.

Column 9, line 55, after 'desiccants', please delete "34", and substitute therefor --30--.

Column 9, line 67, please delete "11b", and substitute therefor --11a--.

Column 11, line 4, please delete "40c", and substitute therefor --40--.

Column 11, line 23, after 'roll', please delete "56c", and substitute therefor --36c--.

Column 14, line 23, after 'FIG.', please delete "21", and substitute therefor --20--.

Column 14, line 53, after 'term', please delete "propagule"0", and substitute therefor --"propagule"--.

UNITED STATES PATENT AND TRADEMARK OFFICE
CERTIFICATE OF CORRECTION

PATENT NO. : 5,666,784
DATED : September 16, 1997
INVENTOR(S) : Donald E. Weder

It is certified that error appears in the above-identified patent and that said Letters Patent is hereby corrected as shown below:

Column 14, line 66, please delete "21-28", and substitute therefor --21-27--.

Column 16, line 37, please delete "112", and substitute therefor --106--.

Column 17, line 6, after '"Article Forming System,"', please delete "0".

Column 17, line 9, please delete "40", and substitute therefor --118--.

Column 18, line 12, please delete "11f", and substitute therefor --11--.

Column 18, line 15, please delete "104g", and substitute therefor --104--.

Signed and Sealed this

First Day of September, 1998

Attest:

BRUCE LEHMAN

*Attesting Officer*  *Commissioner of Patents and Trademarks*